(12) United States Patent
Lu et al.

(10) Patent No.: US 10,581,623 B2
(45) Date of Patent: Mar. 3, 2020

(54) DATA PACKET PROCESSING METHOD AND APPARATUS

(71) Applicant: Huawei Technologies Co., Ltd., Shenzhen (CN)

(72) Inventors: Wei Lu, Shanghai (CN); Huan Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 16/024,234

(22) Filed: Jun. 29, 2018

(65) Prior Publication Data

US 2018/0323982 A1 Nov. 8, 2018

Related U.S. Application Data

(63) Continuation of application No. PCT/CN2015/100322, filed on Dec. 31, 2015.

(51) Int. Cl.
*H04L 12/14* (2006.01)
*H04W 4/24* (2018.01)
*H04L 12/24* (2006.01)

(52) U.S. Cl.
CPC ...... *H04L 12/1407* (2013.01); *H04L 41/0893* (2013.01); *H04W 4/24* (2013.01)

(58) Field of Classification Search
CPC .................. H04L 12/1407; H04L 41/0893
See application file for complete search history.

(56) References Cited

U.S. PATENT DOCUMENTS

2009/0182883 A1 7/2009 Giaretta et al.
2011/0320620 A1* 12/2011 Cutler .................. H04L 63/102
 709/229

(Continued)

FOREIGN PATENT DOCUMENTS

CN 101127609 A 2/2008
CN 102196006 A 9/2011

(Continued)

OTHER PUBLICATIONS

Foreign Communication From a Counterpart Application, Russian Application No. 2018127753, Russian Decision on Grant dated Apr. 25, 2019, 13 pages.

(Continued)

*Primary Examiner* — Kevin D Mew
(74) *Attorney, Agent, or Firm* — Conley Rose, P.C.

(57) ABSTRACT

A data packet processing method and apparatus is disclosed. According to the method, a storage apparatus disposed on a network side stores a correspondence between an identifier and data flow characteristic information. When configuring a policy for a data packet including a first identifier, a network-side device requests the storage apparatus for data flow characteristic information corresponding to the first identifier. A PCEF receives a data packet that is sent by UE, matches the data packet against the data flow characteristic information, and when the data packet matches the data flow characteristic information, executes a policy on the data packet according to policy information corresponding to the first identifier. According to the method provided in embodiments of the present disclosure, transmitting a considerable amount of data flow characteristic information on an interface of an SCEF is avoided, and load on the SCEF is relieved.

20 Claims, 15 Drawing Sheets

(56) References Cited

U.S. PATENT DOCUMENTS

| | | | |
|---|---|---|---|
| 2012/0230286 A1 | 9/2012 | Nishida et al. | |
| 2012/0233335 A1* | 9/2012 | Landry | H04L 41/0893 709/227 |
| 2012/0250573 A1* | 10/2012 | Kulasingam | H04W 4/24 370/254 |
| 2013/0054800 A1* | 2/2013 | Fernandez Alonso | H04L 67/2842 709/224 |
| 2013/0085909 A1* | 4/2013 | Mo | G06Q 40/025 705/30 |
| 2013/0091276 A1 | 4/2013 | Wang | |
| 2014/0119241 A1 | 5/2014 | Jung | |
| 2014/0335842 A1* | 11/2014 | Kulasingam | H04W 4/60 455/418 |
| 2015/0245239 A1 | 8/2015 | Tan et al. | |
| 2015/0304939 A1 | 10/2015 | Liu et al. | |
| 2016/0112896 A1* | 4/2016 | Karampatsis | H04W 28/0252 370/230.1 |
| 2017/0359186 A1* | 12/2017 | Atarius | H04L 12/1407 |
| 2017/0359749 A1* | 12/2017 | Dao | H04W 28/0268 |

FOREIGN PATENT DOCUMENTS

| | | |
|---|---|---|
| CN | 103166936 A | 6/2013 |
| CN | 103392353 A | 11/2013 |
| CN | 103476022 A | 12/2013 |
| CN | 103563430 A | 2/2014 |
| CN | 103974248 A | 8/2014 |
| RU | 2484606 C2 | 6/2013 |
| RU | 2510593 C2 | 3/2014 |
| RU | 2523962 C2 | 7/2014 |
| WO | 2015153589 A1 | 10/2015 |
| WO | 2016206354 A1 | 12/2016 |

OTHER PUBLICATIONS

Foreign Communication From a Counterpart Application, Russian Application No. 2018127753, Russian Search Report dated Apr. 23, 2019, 2 pages.

Foreign Communication From a Counterpart Application, Russian Application No. 2018127753, English Translation of Russian Search Report dated Apr. 23, 2019, 2 pages.

3GPP TR 23.708 V13.0.0 (Jun. 2015), Technical Report, 3rd Generation Partnership Project; Technical Specification Group Services and System Aspects; Architecture enhancements for service capability exposure (Release 13), 31 pages.

3GPP TS 23.203 V13.6.0 (Dec. 2015), Technical Specification, 3rd Generation Partnership Project; Technical Specification Group Services and System Aspects; Policy and charging control architecture (Release 13), 242 pages.

3GPP TS 23.682 V13.4.0 (Dec. 2015), Technical Specification, 3rd Generation Partnership Project; Technical Specification Group Services and System Aspects; Architecture enhancements to facilitate communications with packet data networks and applications (Release 13), 81 pages.

Machine Translation and Abstract of Chinese Publication No. CN102196006, Sep. 21, 2011, 13 pages.

Machine Translation and Abstract of Chinese Publication No. CN103166936, Jun. 19, 2013, 27 pages.

Machine Translation and Abstract of Chinese Publication No. CN103974248, Aug. 6, 2014, 25 pages.

Machine Translation and Abstract of International Publication No. WO2016206354, Dec. 29, 2016, 30 pages.

Foreign Communication From a Counterpart Application, Chinese Application No. 201580085687.6, Chinese Office Action dated Dec. 3, 2019, 4 pages.

Foreign Communication From a Counterpart Application, Chinese Application No. 201580085687.6, Chinese Search Report dated Nov. 25, 2019, 3 pages.

* cited by examiner

900

An SCEF receives a first message that is sent by an AS, where the first message includes data flow information, policy information corresponding to the data flow information, and a first user equipment UE list, and the first UE list includes at least two UEs — S910

The SCEF sends a second message to a policy and charging rules function PCRF, where the second message includes the data flow information, the policy information, and a second UE list, and the second UE list includes at least one UE, so that the PCRF executes, according to the second UE list, a policy corresponding to the policy information on UE included in the second UE list — S920

An AS sends a second message to a service capability exposure function SCEF, where the second message includes a first identifier and policy information corresponding to the first identifier — S1010

A PCRF receives a second message that is sent by a service capability exposure function SCEF, where the second message includes data flow information, policy information corresponding to the data flow information, and a second UE list, and the second UE list includes at least one UE — S1110

The PCRF executes, according to the second UE list, a policy corresponding to the policy information on UE included in the second UE list — S1120

FIG. 11

DATA PACKET PROCESSING METHOD AND APPARATUS

CROSS-REFERENCE TO RELATED APPLICATIONS

This application is a continuation of International Application No. PCT/CN2015/100322 filed on Dec. 31, 2015, which is hereby incorporated by reference in its entirety.

TECHNICAL FIELD

Embodiments of the present application relate to the communications field, and more specifically, to a data packet processing method and an apparatus.

BACKGROUND

A core network in a system architecture evolution (SAE) network mainly includes three logical functionalities: a mobility management entity (MME), a serving gateway (SGW), and a packet data network (PDN) gateway, PGW for short.

The MME is responsible for functions such as non-access stratum (NAS) signaling transmission, NAS signaling encryption, roaming, tracking, temporary user identity allocation, and security. The SGW is responsible for functions such as a local mobility anchor, a mobility anchor within a 3rd Generation Partnership Project (3GPP) system, and lawful interception of related information. The PGW is responsible for related functions such as policy execution, charging, and lawful interception.

The SAE network may further include an HSS, a PCRF, and the like. The home subscriber server (HSS) is configured to store subscriber subscription information. The policy and charging rules function (PCRF) is a functional entity in a policy and charging control (PCC) architecture, and is configured to set a policy and charging rule for a service flow in a network. The policy and charging rule includes a Quality of Service (QoS) rule, and the like.

In addition, the PCC architecture may further include a policy and charging enforcement function (PCEF), which is configured to complete a policy and charging enforcement function. The functional entity is usually jointly deployed with the PGW. The PCC architecture may further include a subscription profile repository (SPR), which is a database storing a parameter of a service data flow of a subscriber.

To open related information of a 3GPP network to a 3rd party application (3rd Application) server, the prior art provides an enhanced network architecture. That is, a logical functional entity—a service capability exposure function (SCEF) is introduced. There is an interface between this logical function and a network element device in the SAE network. An upper layer of the SCEF is an application layer, that is, the 3rd party application server (AS). The 3rd party application server may establish a connection to the SCEF, so that the 3GPP network may send information to the 3rd party application server by using the SCEF, and the 3rd party application server may also send information to the 3GPP network by using the SCEF.

In this enhanced network architecture, related information transmitted during execution of charging or another policy for a data flow is transmitted among the AS, the SCEF, and the PCRF on a per user equipment (UE) basis. A relatively large amount of the related information of charging and another policy results in relatively heavy load of information transferred on the interface of the SCEF. Particularly, if related information of charging and another policy corresponding to UE frequently changes, the related information of charging and another policy needs to be frequently transmitted on the interface.

SUMMARY

Embodiments of the present disclosure provide a data packet processing method and apparatus, so as to avoid transmitting a considerable amount of data flow characteristic information on an interface of an SCEF, and relieve load on the SCEF.

According to a first aspect, a data packet processing method is provided, where from a perspective of a PCEF, the method includes:

receiving, by the policy and charging enforcement function PCEF, a fourth message that is sent by a policy and charging rules function PCRF, where the fourth message includes a first identifier and policy information corresponding to the first identifier;

sending, by the PCEF, a fifth message to a storage apparatus, where the fifth message includes the first identifier, the storage apparatus stores a correspondence between an identifier and data flow characteristic information, and the fifth message is used to request the storage apparatus for data flow characteristic information corresponding to the first identifier;

receiving, by the PCEF, a sixth message that is sent by the storage apparatus, where the sixth message includes the data flow characteristic information corresponding to the first identifier;

receiving, by the PCEF, a data packet that is sent by user equipment UE, and matching information carried in the data packet against the data flow characteristic information; and executing, by the PCEF, a policy on the data packet according to the policy information when the information carried in the data packet matches the data flow characteristic information.

In a possible implementation of the first aspect, the data flow characteristic information corresponding to the first identifier includes 5-tuple information and/or a uniform resource locator URL corresponding to the first identifier, and the method may further include:

determining, by the PCEF, whether 5-tuple information and/or a URL included in the data packet is the 5-tuple information and/or the URL corresponding to the first identifier; and when the PCEF determines that the 5-tuple information and/or the URL included in the data packet is the 5-tuple information and/or the URL corresponding to the first identifier, executing, by the PCEF, the policy on the data packet according to the policy information.

In another possible implementation of the first aspect, the data flow characteristic information corresponding to the first identifier includes application detection information corresponding to the first identifier;

the receiving, by the PCEF, a data packet that is sent by user equipment UE, and matching information carried in the data packet against the data flow characteristic information includes:

receiving, by the PCEF, the data packet that is sent by the UE, checking the data packet according to the application detection information corresponding to the first identifier, and determining whether the data packet belongs to an application corresponding to the first identifier; and the executing, by the PCEF, a policy on the data packet according to the policy information when the information carried in the data packet matches the data flow characteristic information includes:

executing, by the PCEF, the policy on the data packet according to the policy information when the PCEF determines that the data packet belongs to the application corresponding to the first identifier.

In the first aspect and the corresponding implementations, the method may further include:

determining, by the PCEF, that the data flow characteristic information corresponding to the first identifier is not locally stored.

According to a second aspect, a data packet processing method is provided, where from a perspective of a storage apparatus, the method includes:

receiving, by the storage apparatus, a first message that is sent by a 3rd party application server AS by using a service capability exposure function SCEF, where the first message includes information indicating a correspondence between an identifier and data flow characteristic information;

receiving, by the storage apparatus, a fifth message that is sent by a policy and charging enforcement function PCEF, where the fifth message includes a first identifier, and the fifth message is used to request the storage apparatus for data flow characteristic information corresponding to the first identifier;

determining, by the storage apparatus according to the first identifier and the correspondence, the data flow characteristic information corresponding to the first identifier; and sending, by the storage apparatus, a sixth message to the PCEF, where the sixth message includes the data flow characteristic information corresponding to the first identifier.

In a possible implementation of the second aspect, the correspondence may include a correspondence between an identifier and application detection information.

In this implementation, the determining, by the storage apparatus according to the first identifier and the correspondence, the data flow characteristic information corresponding to the first identifier may include:

determining, by the storage apparatus according to the first identifier and the correspondence between an identifier and application detection information, application detection information corresponding to the first identifier, where the application detection information corresponding to the first identifier is used as the data flow characteristic information corresponding to the first identifier, and the application detection information corresponding to the first identifier is used to check whether a corresponding data packet belongs to an application corresponding to the first identifier.

In another possible implementation of second aspect, the correspondence may include a correspondence between an identifier and at least one of 5-tuple information or a uniform resource locator URL.

In this implementation, the determining, by the storage apparatus according to the first identifier and the correspondence, the data flow characteristic information corresponding to the first identifier may include:

determining, by the storage apparatus according to the first identifier and the correspondence between an identifier and at least one of 5-tuple information or a URL, 5-tuple information and/or a URL corresponding to the first identifier, where the 5-tuple information and/or the URL corresponding to the first identifier is used as the data flow characteristic information corresponding to the first identifier.

According to a third aspect, a data packet processing method is provided, where from a perspective of an AS, the method includes:

sending, by the 3rd party application server AS, a second message to a service capability exposure function SCEF, where the second message includes a first identifier and policy information corresponding to the first identifier.

In a possible implementation of the third aspect, the method may further include:

sending, by the AS, a first message to the SCEF, where the first message includes a correspondence between an identifier and data flow characteristic information.

In this implementation, the second message may further include a first user equipment UE list, and the first UE list includes at least two UEs.

In another possible implementation of the third aspect, the correspondence may include a correspondence between an identifier and application detection information.

In this implementation, the correspondence may include a correspondence between an identifier and at least one of 5-tuple information or a uniform resource locator URL.

According to a fourth aspect, a data packet processing method is provided, where from a perspective of an SCEF, the method includes:

receiving, by the service capability exposure function SCEF, a second message that is sent by a 3rd party application server AS, where the second message includes a first identifier and policy information corresponding to the first identifier; and sending, by the SCEF, a third message to a policy and charging rules function PCRF, where the third message includes the first identifier and the policy information.

In a possible implementation of the fourth aspect, the second message may further include a first user equipment UE list, and the first UE list includes at least two UEs; and the third message further includes a second UE list, and the second UE list includes at least one UE.

In this implementation, the first UE list and the second UE list may be identical.

In a possible implementation of the fourth aspect, the method may further include:

receiving, by the SCEF, a first message that is sent by the AS, where the first message includes a correspondence between an identifier and data flow characteristic information; and sending, by the SCEF, the first message to the storage apparatus.

In a feasible solution of this implementation, the correspondence includes a correspondence between an identifier and application detection information.

In another feasible solution of this implementation, the correspondence includes a correspondence between an identifier and at least one of 5-tuple information or a uniform resource locator URL.

According to a fifth aspect, a data packet processing method is provided, where from a perspective of a PCRF, the method includes:

receiving, by the policy and charging rules function PCRF, a third message that is sent by a service capability exposure function SCEF, where the third message includes a first identifier and policy information corresponding to the first identifier;

sending, by the PCRF, a fourth message to a policy and charging enforcement function PCEF, where the fourth message includes the first identifier and the policy information.

In a possible implementation of the fifth aspect, the third message may further include a user equipment UE list, and the sending, by the PCRF, a fourth message to a policy and charging enforcement function PCEF may include:

sending, by the PCRF, the fourth message to the PCEF according to the UE list, where the fourth message instructs to execute, according to the policy information, a policy on UE included in the UE list.

Based on the foregoing technical solutions, according to the data packet processing method in this embodiment of the present disclosure, a storage apparatus disposed on a network side stores a correspondence between an identifier and data flow characteristic information. When configuring a policy for a data packet including a first identifier, a network-side device requests the storage apparatus for data flow characteristic information corresponding to the first identifier. This avoids transmitting a considerable amount of data flow characteristic information on an interface of an SCEF, and relieves load on the SCEF.

According to a sixth aspect, another data packet processing method is provided, where from a perspective of an SCEF, the method includes:

receiving, by the service capability exposure function SCEF, a first message that is sent by a 3rd party application server AS, where the first message includes data flow information, policy information corresponding to the data flow information, and a first user equipment UE list, and the first UE list includes at least two UEs; and sending, by the SCEF, a second message to a policy and charging rules function PCRF, where the second message includes the data flow information, the policy information, and a second UE list, and the second UE list includes at least one UE, so that the PCRF executes, according to the second UE list, a policy corresponding to the policy information on UE included in the second UE list.

In a possible implementation of the sixth aspect, the first UE list and the second UE list may be identical.

According to a seventh aspect, another data packet processing method is provided, where from a perspective of an AS, the method includes:

sending, by the 3rd party application server AS, a first message to a service capability exposure function SCEF, where the first message includes data flow information, policy information corresponding to the data flow information, and a first user equipment UE list, and the first UE list includes at least two UEs.

According to an eighth aspect, another data packet processing method is provided, where from a perspective of a PCRF, the method includes:

receiving, by the policy and charging rules function PCRF, a second message that is sent by a service capability exposure function SCEF, where the second message includes the data flow information, policy information corresponding to the data flow information, and a second UE list, and the second UE list includes at least one UE; and executing, by the PCRF according to the second UE list, a policy corresponding to the policy information on UE included in the second UE list.

Based on the foregoing technical solutions, according to the data packet processing method in another embodiment of the present disclosure, in a data packet processing process, an AS sends data flow information of multiple UEs and corresponding policy information to a network-side device at a time by using an SCEF. This avoids transmitting a considerable amount of data flow characteristic information on an interface of the SCEF, and relieves load on the SCEF.

The present disclosure further provides a data packet processing apparatus implementing the foregoing eight aspects, and the apparatus includes a PCEF, a storage apparatus, an AS, an SCEF, and a PCRF, which are configured to implement the foregoing aspects and corresponding implementations.

The present disclosure further provides a system including a 3rd party application server AS, a service capability exposure function SCEF, and a policy and charging rules function PCRF that are configured to implement the first to the fifth aspects. The system may further include a policy and charging enforcement function PCEF. The PCEF, the SCEF, the PCRF, and the AS are respectively corresponding to corresponding apparatuses in the foregoing data packet processing apparatus implementing the foregoing eight aspects.

The present disclosure further provides a system including a 3rd party application server AS, a service capability exposure function SCEF, and a policy and charging rules function PCRF that are configured to implement the sixth to the eight aspects. The system may further include a policy and charging enforcement function PCEF. The PCEF, the SCEF, the PCRF, and the AS are respectively corresponding to corresponding apparatuses in the foregoing data packet processing apparatus implementing the foregoing eight aspects.

It should be understood that the policy information may include at least one type of payer information, Quality of Service QoS information, or service chain information.

In addition, the first identifier may include an application name.

BRIEF DESCRIPTION OF THE DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

FIG. 9 is a schematic flowchart of a data packet processing method according to another embodiment of the present disclosure;

FIG. 10 is a schematic flowchart of a data packet processing method according to another embodiment of the present disclosure;

FIG. 11 is a schematic flowchart of a data packet processing method according to another embodiment of the present disclosure;

DETAILED DESCRIPTION

Figure 1:
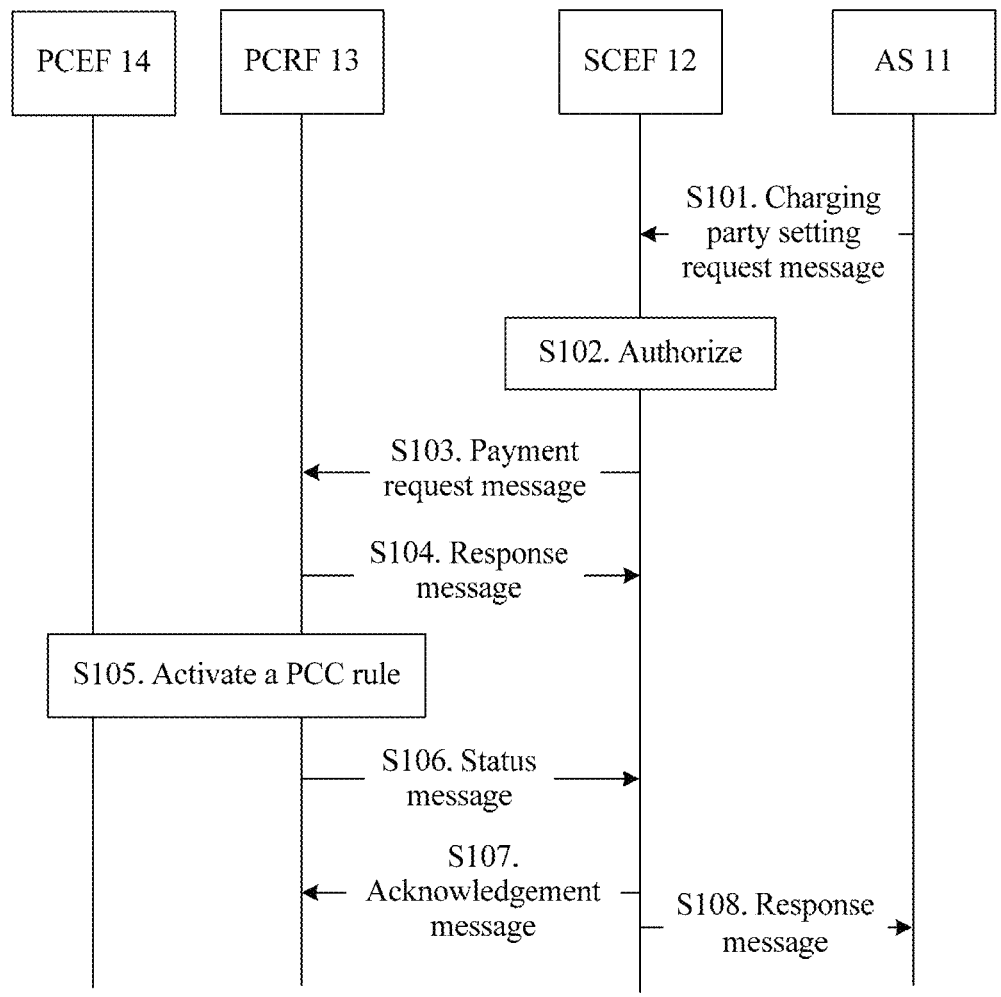
FIG. 1 is a schematic diagram of an existing charging procedure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one components interacting with another component in a local system, a distributed system, and/or across a network such as the Internet interacting with other systems by using the signal).

It should be understood that the technical solutions in the embodiments of the present disclosure may be applied to a Long Term Evolution (LTE) architecture, or may be applied to a Universal Mobile Telecommunications System (UMTS) Terrestrial Radio Access Network (UTRAN) architecture, or a Global System for Mobile Communications (GSM)/Enhanced Data rates for GSM Evolution (Enhanced Data rates for GSM Evolution, EDGE) system radio access network (GSM EDGE Radio Access Network, GERAN) architecture. In the UTRAN architecture or the GERAN architecture, a function of an MME is completed by a serving general packet radio service (GPRS) support node (Serving GPRS Support Node, SGSN), and a function of an SGW/PGW is completed by a gateway GPRS support node (Gateway GPRS Support Node, GGSN). The technical solutions in the embodiments of the present disclosure may further be applied to another communications system, such as a future 5G communications system even. The embodiments of the present disclosure are not limited thereto.

The embodiments of the present disclosure are used for executing various policies, such as a charging policy, Quality of Service (QoS) policy, and a service chain policy. The following uses an example to briefly describe a charging procedure in an existing enhanced network architecture, that is, a network architecture including an SCEF.

As shown in FIG. 1, a network architecture includes an AS 11, an SCEF 12, a PCRF 13, and a PCEF 14. A charging procedure 100 includes the following steps:

S101. After the AS 11 establishes a connection to UE, the AS 11 sends, to the SCEF 12, a charging party setting request message requesting to be a data flow payer. The charging party setting request message includes payer information (Sponsor Information) and 5-tuple information (IP Filter Information). The IP Filter Information is a type of data flow information which data flow information is paid by the AS 11 herein.

S102. The SCEF 12 authorizes the AS 11 to perform data flow charging.

S103. The SCEF 12 determines a PCRF 13 corresponding to the UE, and the SCEF 12 sends a payment request message to the PCRF 13, and the message includes the IP filter information and the sponsor information.

S104. The PCRF 13 returns a response message to the SCEF 12.

S105. The PCRF 13 activates a PCC rule on the PCEF 14 according to a 3GPP TS23.203 protocol, and executes a policy that a charging party charges a data packet including the IP filter information for the UE.

S106, S107, and S108 are subsequent conventional steps of charging. S106: The PCRF 13 reports a status message to the SCEF 12. S107: The SCEF 12 feeds back an acknowledgement (ACK) message to the PCRF 13. S108: The SCEF 12 feeds back a response message to the AS 11. Details are not described herein.

The foregoing procedure is on a per UE basis. A relatively large amount of the IP filter information usually results in relatively heavy load of information transferred on an interface of an SCEF. Particularly, if IP filter information of the UE frequently changes and the IP filter information needs to be frequently updated, the IP filter information needs to be frequently transferred on the interface, and the load on the interface of the SCEF increases.

In addition, in the foregoing procedure, the IP filter information is used as an example for describing the charging procedure. In actual application, there may be a scenario in which an AS performs charging for some applications. The AS requests to be a payer of an application by using the SCEF, from the PCRF and the PCEF. In this case, the AS sends application-related information, for example, an application name. A corresponding functional module checks a data packet, and determines an application to which the data packet belongs. When the data packet belongs to a corresponding application, corresponding charging processing is performed on the data packet. A specific execution manner of the charging processing is not limited herein. On this basis, a relatively large amount of application detection information is required for application detection. In the prior art, the application detection information is usually stored in the PCEF or in a data packet detection function (Traffic Detection Function, TDF). The application detection information includes information such as a detection algorithm and an application characteristic. When the application detection information needs to be frequently updated, extremely heavy load is also caused on the interface of the SCEF.

During execution of a policy other than charging, there is also a problem that a large amount of transmitted information causes extremely heavy load on the interface of the SCEF.

Figure 2:
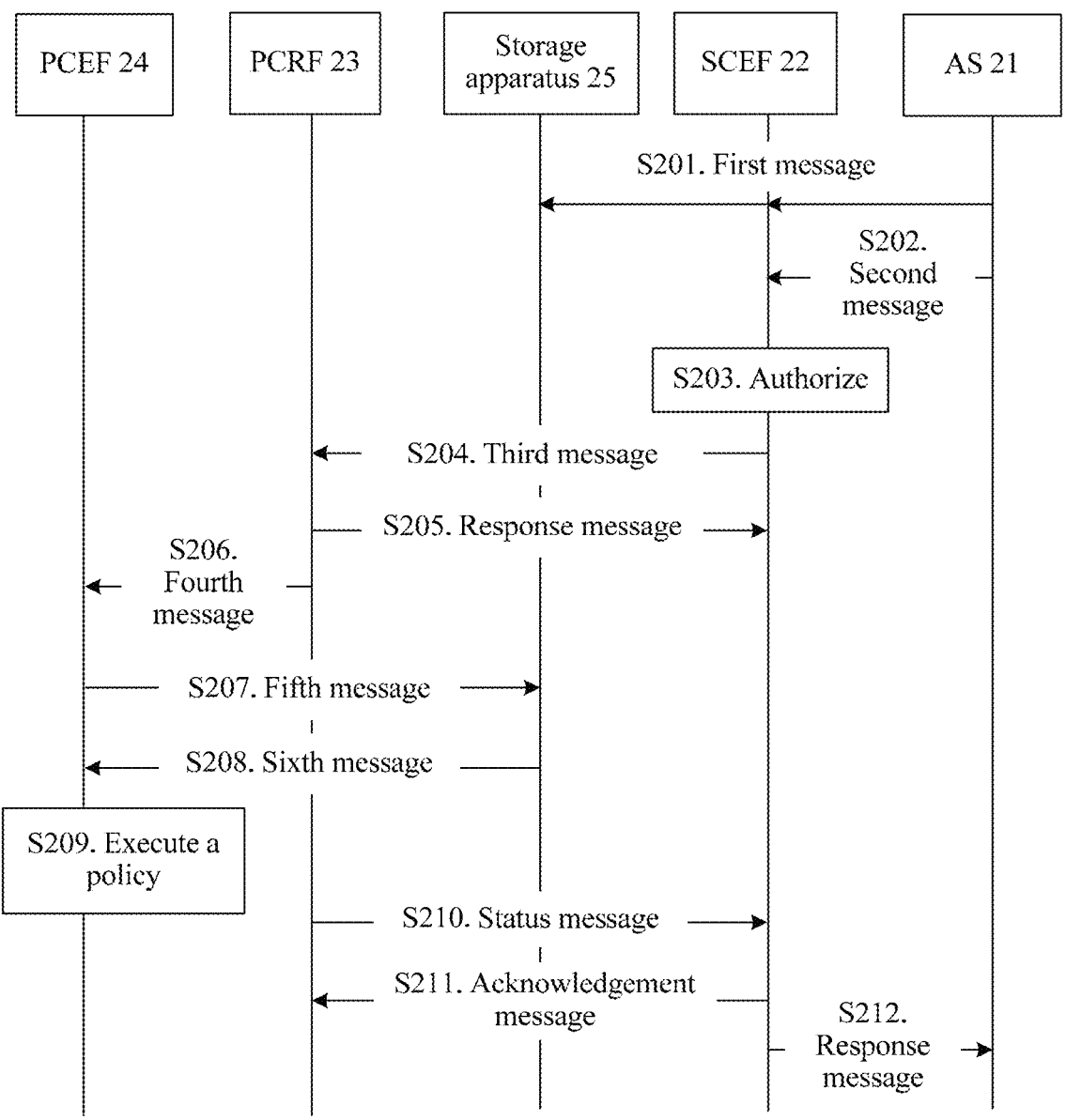
FIG. 2 is a schematic flowchart of a data packet processing method according to an embodiment of the present disclosure.

FIG. 2 shows a data packet processing method 200 according to an embodiment of the present disclosure. In comparison with the prior art, a storage apparatus is added in the method 200. The storage apparatus is disposed on a network side, and may be jointly disposed with a PCRF, a PCEF, a TDF, an MME, an SGW, or a PGW, or may be independently disposed. This embodiment of the present disclosure is not limited thereto. In addition, a name of the storage apparatus is not limited, and may be another name. The method 200 includes the following steps.

S201. An AS 21 sends a first message to an SCEF 22, where the first message includes an identifier and corresponding data flow characteristic information, that is, the first message includes information indicating a correspondence between an identifier and data flow characteristic information.

The identifier may include an application name, or may be a character string.

The data flow characteristic information may be used to represent a characteristic of a data flow. For example, the data flow characteristic information may be application detection information. The application detection information is used for application detection, and may include application characteristic information, an application detection algorithm, or the like. An application to which a data packet belongs may be determined according to the application detection information.

The data flow characteristic information may be at least one of 5-tuple information or a uniform resource locator (URL) (that is, may be 5-tuple information, or may be a URL, or may be 5-tuple information and a URL).

The SCEF 22 forwards the first message to a storage apparatus 25, so that the storage apparatus 25 stores the correspondence between an identifier and data flow characteristic information.

It should be understood that in the step S201, the first message may include only an identifier and application detection information corresponding to the identifier (that is, the first message may include only information about a correspondence between an identifier and application detection information), or may include only an identifier and at least one of 5-tuple information or a URL corresponding to the identifier (that is, the first message may include only information about a correspondence between an identifier and at least one of 5-tuple information or a URL), or may include both the foregoing two correspondences. This embodiment of the present disclosure is not limited thereto.

Correspondingly, the storage apparatus receives the first message that is sent by the AS by using the SCEF. The storage apparatus 25 stores the correspondence between an identifier and data flow characteristic information according to the first message.

In this case, the storage apparatus 25 on the network side stores data flow characteristic information that is transmitted for multiple times in the prior art and that consumes a large amount of network traffic. This reduces pressure on an interface of the SCEF in a subsequent process.

The storage apparatus 25 stores the identifier and the data flow characteristic information corresponding to the identifier that are in the first message (that is, the storage apparatus 25 stores the correspondence between an identifier and data flow characteristic information). In a specific example, the correspondence may be shown in Table 1.

TABLE 1

| Identifier | Data flow characteristic information |
|---|---|
| Application name: A | 5-tuple information (IP 5-tuple list)<br>For example:<br>10.125.1.0<br>11.125.1.0<br>. . . |
| Character string: B | URL<br>For example:<br>www.weixin.com<br>. . . |
| Application name: C | Application detection information<br>For example:<br>application characteristic information<br>an application detection algorithm<br>. . . |
| . . . | . . . |

S202. The AS 21 sends a second message to the SCEF 22, where the second message includes a first identifier and policy information corresponding to the first identifier. The second message is used to request the network side to execute a corresponding policy. Correspondingly, the SCEF receives the second message that is sent by the AS.

For example, the policy information is used for executing a charging procedure. The second message may be used for requesting to set a payer, and the second message may include payer information and the first identifier requesting charging. The first identifier may include an application name. The second message is an application programming interface (API) request message.

It should be understood that the second message may further include a UE identifier or a first UE list, so as to identify UE that needs to be charged. When the second message includes the first UE list, the first UE list includes at least two UEs.

S203. The SCEF 22 may authorize the network side to execute a corresponding policy as requested in the second message. For example, when the policy information is used for executing the charging procedure, the SCEF 22 may authorize the AS 21 to perform data flow charging. It should be understood that in this embodiment of the present disclosure, the step S203 is optional, that is, this step may be omitted in specific implementation.

S204. The SCEF 22 sends a third message to a PCRF 23, where the third message includes the first identifier and the policy information corresponding to the first identifier. Correspondingly, the PCRF receives the third message that is sent by the SCEF. Similar to the second message, the third message is also used to request the network side to execute a corresponding policy. The second message and the third message are messages transmitted between different apparatuses on the network side.

For example, the policy information is used for executing the charging procedure. The third message may be used for requesting to set a payer, and the third message includes the payer information and the first identifier requesting charging that are in the second message. When the second message further includes the UE identifier, the third message may further include the UE identifier. When the second message further includes the first UE list, the third message may further include a second UE list.

It should be understood that the foregoing process (S202 to S204) may occur in a network attachment process of first UE. At the same time, the AS 21 notifies the PCRF 23 of policy information of another UE (UE in the UE list) by using the SCEF 22, so that the PCRF 23 performs a policy operation on a data flow corresponding to the identifier for all UEs in the UE list. In this case, the SCEF 22 notifies all PCRFs 23 of the UE list. That is, the first UE list and the second UE list may be identical.

It should be understood that the foregoing process (S202 to S204) may occur after attachment of UE is complete. When data flow characteristic information or policy information needs to be modified, the SCEF 22 determines a PCRF 23 in which UE in the UE list is located, and then separately sends different third messages to different PCRFs 23 in which different UEs are located. In this case, UE included in the second UE list in the third message is attached to the PCRF 23, and all UEs included in the second UE list are included in the first UE list. The first UE list further includes UE attached to a PCRF other than the PCRF 12.

S205. The PCRF 23 sends a response message for the third message to the SCEF 22.

S206. For UE corresponding to an UE identifier or a second UE list, the PCRF 23 sends a fourth message to a PCEF 24, where the fourth message includes the first identifier and the policy information, so that the PCEF 24 executes a policy corresponding to the first identifier. For example, the policy information is used for executing the charging procedure. The fourth message includes the payer information and the first identifier charged by the payer. Specifically, the payer information and the first identifier charged by the payer may be included in a PCC rule, so that when the PCEF 24 installs and activates the PCC rule, the PCEF 24 executes a policy that a payer identified in the payer information charges a data flow identified by the first identifier charged by the payer.

It should be understood that the PCRF may send the fourth message to the PCEF in a PCC rule delivering process. That is, in the PCC rule delivering process, the first identifier and the policy information corresponding to the first identifier may be delivered at the same time. Alternatively, the PCRF may send the fourth message to the PCEF when the PCEF requests the PCRF for a rule according to a user identifier. The method 200 is merely a possible implementation, and a time of sending the fourth message is not limited in this embodiment of the present disclosure.

S207. The PCEF 24 sends a fifth message to the storage apparatus 25 according to the first identifier and the policy information in the fourth message received in the step S206, so as to request data flow characteristic information corresponding to the first identifier.

For example, the policy information is used for executing the charging procedure. The fourth message includes the payer information and the first identifier charged by the payer. The PCEF 24 sends the fifth message to the storage apparatus 25, so as to request the data flow characteristic information corresponding to the first identifier charged by the payer.

It should be understood that in this embodiment of the present disclosure, the PCEF 24 may store locally a correspondence between some identifiers and data flow characteristic information. The correspondence may be obtained from the storage apparatus and stored by the PCEF 24 when a system starts. Alternatively, the correspondence may be requested by the PCEF 24 from the storage apparatus 25 by using the fifth message when the PCEF 24 receives the fourth message that includes the first identifier and the policy information and that is sent by the PCRF 23, and may be stored after receiving, by using a sixth message, the data flow characteristic information corresponding to the first identifier. This embodiment of the present disclosure is not limited thereto.

Before the PCEF 24 sends the fifth message to the storage apparatus 25, the PCEF 24 needs to determine that the data flow characteristic information corresponding to the first identifier is not locally stored. In the specific charging procedure, if the PCEF 24 finds that the payer information and the data flow characteristic information corresponding to the first identifier charged by the payer have been locally stored, the step S207 is omitted. In this case, the data flow characteristic information corresponding to the first identifier charged by the payer is identified as "In Service", so as to ensure that UE previously using the data flow characteristic information does not delete the data flow characteristic information when deactivating the PCC rule. A specific identifier name is not limited, and may be, for example, "Active State", "In Service", or the like.

When receiving a data packet of UE, the PCEF 24 determines, according to a PCC rule of the UE received from the PCRF 23, to execute a policy that the data packet identified by the first identifier of the UE (that is, the data packet includes the first identifier) is paid by the payer, not by the UE. Therefore, the PCEF 24 needs to first determine whether the data packet is the data packet identified by the first identifier. If the PCEF has the data flow characteristic information corresponding to the data packet identified by the first identifier, the PCEF determines, according to the data flow characteristic information, whether the data packet is the data packet identified by the first identifier. If the PCEF 24 does not have the data flow characteristic information corresponding to the data packet identified by the first identifier, the PCEF 24 requests the storage apparatus 25 for obtaining the data flow characteristic information corresponding to the first identifier. Then, whether the data packet belongs to the data flow identified by the first identifier is checked according to the data flow characteristic information. If the data packet belongs to the data flow identified by the first identifier, the data packet is paid by a payer indicated by the payer information.

Specifically, the PCEF 24 may check whether the data packet includes 5-tuple information and/or a URL corresponding to the first identifier. When the data packet includes the 5-tuple information and/or the URL corresponding to the first identifier, the PCEF 24 may determine that the checked data packet should be paid by the payer corresponding to the payer information in the fourth message. Alternatively, the PCEF 24 checks the data packet according to the application detection information, and checks, according to the application detection information, whether the data packet is the data packet identified by the first identifier. If the data packet is the data packet identified by the first identifier, the PCEF 24 may determine that the checked data packet should be paid by the payer corresponding to the payer information in the fourth message.

When the PCEF 24 does not store the data flow characteristic information corresponding to the first identifier, the PCEF 24 sends the fifth message to the storage apparatus 25, and the fifth message is used to request the data flow characteristic information corresponding to the first identifier.

It should be understood that in this embodiment of the present disclosure, the steps of the PCEF 24 may be executed by the TDF. The PCEF or the TDF are usually disposed in a PGW. Therefore, a solution in which the PGW is the execution body is also included in the solutions of the embodiments of the present disclosure. In addition, the PCEF and the TDF in this embodiment of the present disclosure may be jointly disposed. When the PCEF and the TDF are separately disposed, similar to the PCEF, the TDF needs to perform corresponding steps.

S208. The PCEF 24 receives a sixth message that is sent by the storage apparatus 25, where the sixth message includes the data flow characteristic information corresponding to the first identifier. The charging procedure is still used as an example. The sixth message includes the data flow characteristic information corresponding to the first identifier charged by the payer. The PCEF 24 stores the received data flow characteristic information. The PCEF 24 executes a policy that the payer corresponding to the payer information charges the data packet corresponding to the data flow characteristic information.

In conclusion, when the data flow characteristic information corresponding to the first identifier includes the 5-tuple information and/or the uniform resource locator URL corresponding to the first identifier, the PCEF determines whether 5-tuple information and/or a URL included in the data packet is the 5-tuple information and/or the URL corresponding to the first identifier. When the PCEF determines that the 5-tuple information and/or the URL included in the data packet is the 5-tuple information and/or the URL corresponding to the first identifier, the PCEF executes a policy on the data packet according to the policy information. When the data flow characteristic information corresponding to the first identifier includes application detection information corresponding to the first identifier, the PCEF checks the data packet according to the application detection information corresponding to the first identifier, so as to determine whether the data packet belongs to an application corresponding to the first identifier. When the PCEF determines that the data packet belongs to the application corresponding to the first identifier, the PCEF executes a policy on the data packet according to the policy information.

In brief, the PCEF receives data packet that is sent by user equipment UE, and matches information carried in the data packet against the data flow characteristic information. The PCEF executes the policy on the data packet according to the policy information when the information carried in the data packet matches the data flow characteristic information.

S209. The PCRF 23 sends a status message to the SCEF 22.

S210. The SCEF 22 sends an ACK message to the PCRF 23.

S211. The SCEF 22 sends an API response message to the AS 21.

According to the data packet processing method in this embodiment of the present disclosure, a storage apparatus disposed on a network side stores a correspondence between an identifier and data flow characteristic information. When configuring a policy for a data packet including a first identifier, a network-side device requests the storage apparatus for data flow characteristic information corresponding to the first identifier. A PCEF receives the data packet that is sent by UE, matches the data packet against the data flow characteristic information, and when the data packet matches the data flow characteristic information, executes a policy on the data packet according to policy information corresponding to the first identifier. This avoids transmitting a considerable amount of data flow characteristic information on an interface of an SCEF, and relieves load on the SCEF.

The foregoing describes in detail the data packet processing method in one embodiment of the present disclosure from a perspective of an entire procedure. The following separately describes a data packet processing method in embodiments of the present disclosure from perspectives of execution bodies of the method.

Figure 3:
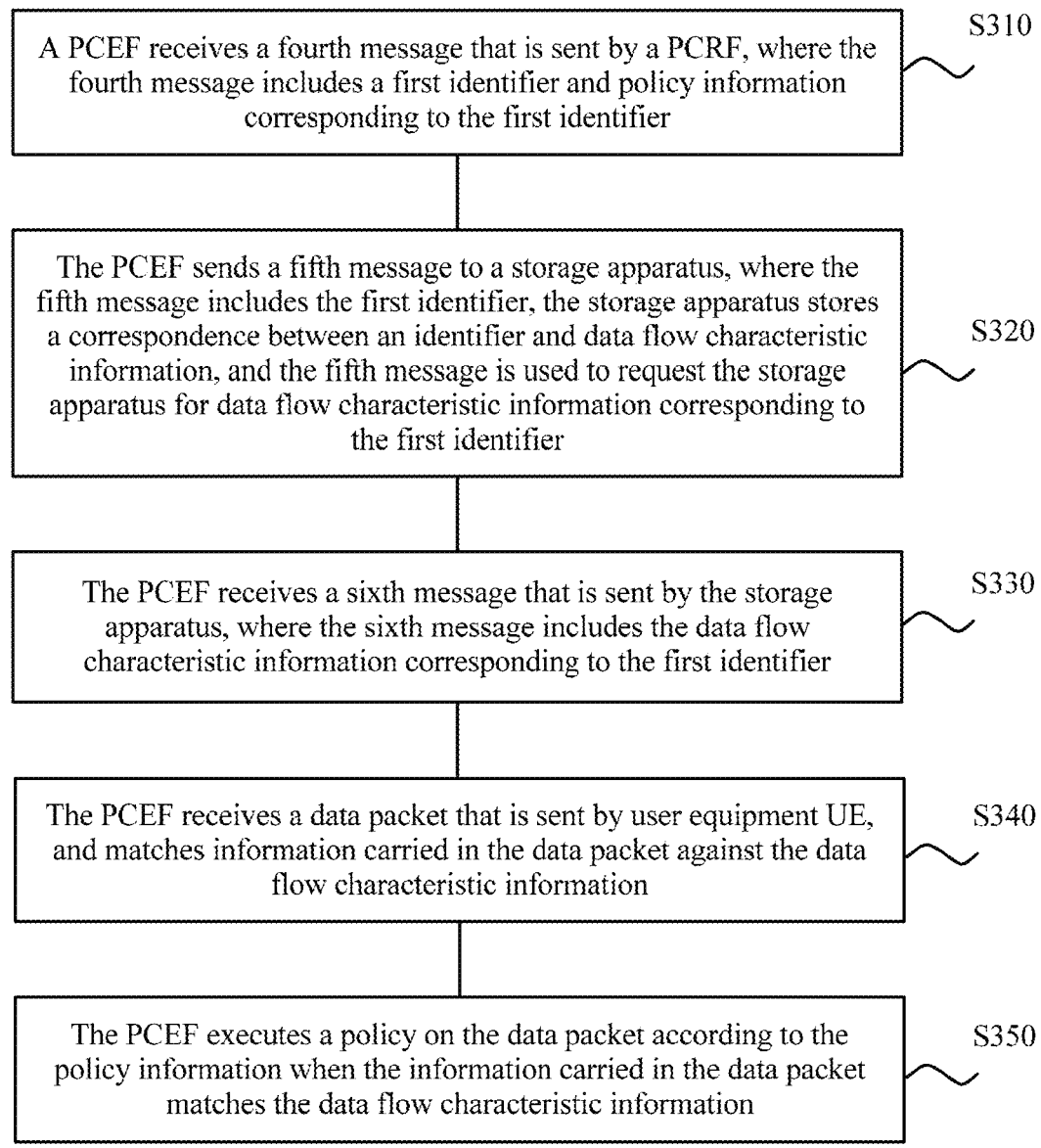
FIG. 3 is a schematic flowchart of a data packet processing method according to another embodiment of the present disclosure.

FIG. 3 is a schematic flowchart of a data packet processing method 300 according to an embodiment of the present disclosure. The method 300 is executed by a PCEF, and includes the following steps:

S310. The PCEF receives a fourth message that is sent by a PCRF, where the fourth message includes a first identifier and policy information corresponding to the first identifier.

S320. The PCEF sends a fifth message to a storage apparatus, where the fifth message includes the first identifier, the storage apparatus stores a correspondence between an identifier and data flow characteristic information, and the fifth message is used to request the storage apparatus for data flow characteristic information corresponding to the first identifier.

S330. The PCEF receives a sixth message that is sent by the storage apparatus, where the sixth message includes the data flow characteristic information corresponding to the first identifier.

S340. The PCEF receives a data packet that is sent by user equipment UE, and matches information carried in the data packet against the data flow characteristic information.

S350. The PCEF executes a policy on the data packet according to the policy information when the information carried in the data packet matches the data flow characteristic information.

Optionally, in an embodiment, the data flow characteristic information corresponding to the first identifier includes 5-tuple information and/or uniform resource locator URL corresponding to the first identifier. The method 300 may further include: determining, by the PCEF, whether 5-tuple information and/or a URL included in the data packet is the 5-tuple information and/or the URL corresponding to the first identifier; and when the PCEF determines that the 5-tuple information and/or the URL included in the data packet is the 5-tuple information and/or the URL corresponding to the first identifier, executing, by the PCEF, the policy on the data packet according to the policy information.

Optionally, in an embodiment, the data flow characteristic information corresponding to the first identifier includes application detection information corresponding to the first identifier. The step S340 in which the PCEF receives a data packet that is sent by user equipment UE, and matches information carried in the data packet against the data flow characteristic information includes: receiving, by the PCEF, the data packet that is sent by the UE, checking the data packet according to the application detection information corresponding to the first identifier, and determining whether the data packet belongs to an application corresponding to the first identifier. The step S350 in which the PCEF executes a policy on the data packet according to the policy information when the information carried in the data packet matches the data flow characteristic information includes: executing, by the PCEF, the policy on the data packet according to the policy information when the PCEF determines that the data packet belongs to the application corresponding to the first identifier.

In this embodiment of the present disclosure, optionally, before the step S320 in which the PCEF sends a fifth message to a storage apparatus, the method 300 may further include: determining, by the PCEF, that the data flow characteristic information corresponding to the first identifier is not locally stored.

In this embodiment of the present disclosure, preferably, the first identifier includes an application name.

According to the data packet processing method in this embodiment of the present disclosure, a storage apparatus disposed on a network side stores a correspondence between an identifier and data flow characteristic information. When executing a policy on a data packet including a first identifier, a PCEF requests the storage apparatus for data flow characteristic information corresponding to the first identifier. The PCEF receives a data packet that is sent by UE, matches the data packet against the data flow characteristic information, and when the data packet matches the data flow characteristic information, executes a policy on the data packet according to policy information corresponding to the first identifier. This avoids transmitting a considerable amount of data flow characteristic information on an interface of an SCEF, and relieves load on the SCEF.

Figure 4:
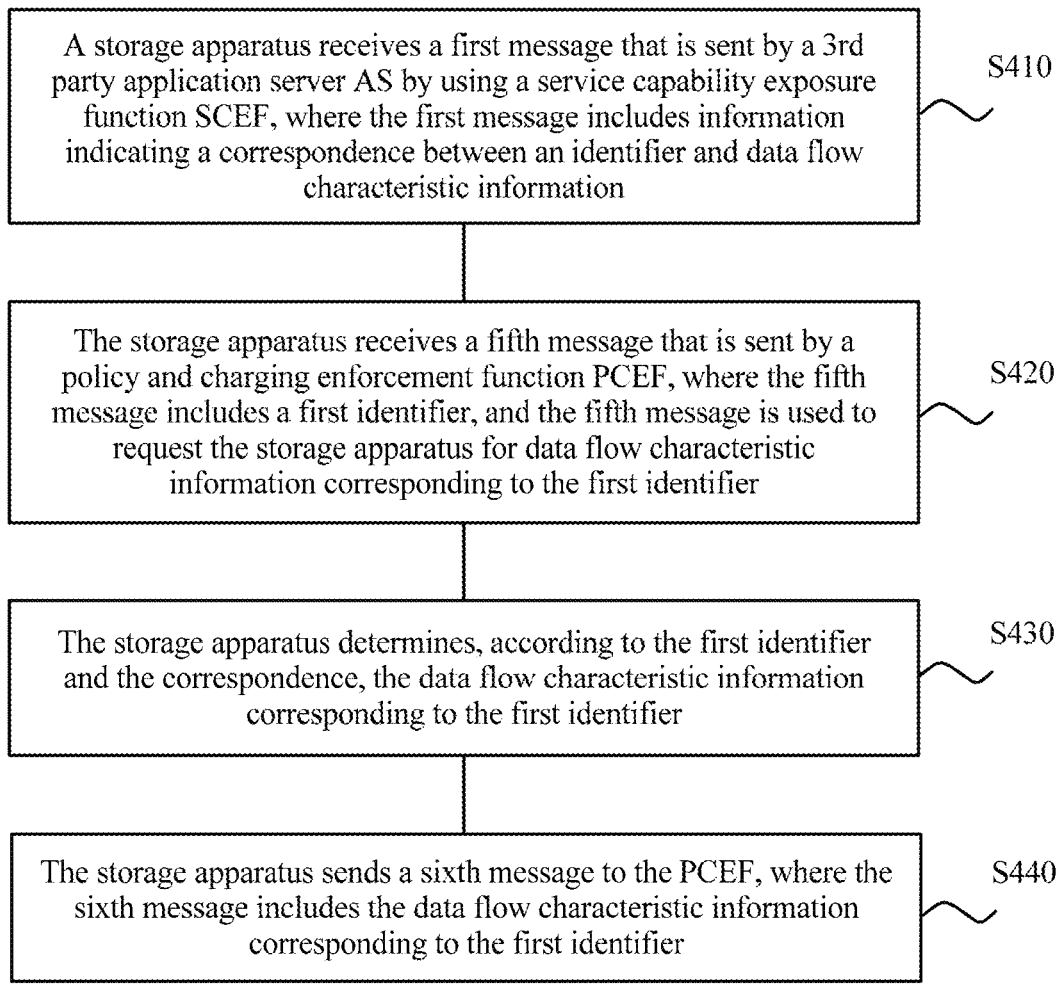
FIG. 4 is a schematic flowchart of a data packet processing method according to another embodiment of the present disclosure.

FIG. 4 is a schematic flowchart of a data packet processing method 400 according to an embodiment of the present disclosure. The method 400 is executed by a storage apparatus, and includes the following steps:

S410. A storage apparatus receives a first message that is sent by a 3rd party application server AS by using a service capability exposure function SCEF, where the first message includes information indicating a correspondence between an identifier and data flow characteristic information.

S420. The storage apparatus receives a fifth message that is sent by a policy and charging enforcement function PCEF, where the fifth message includes a first identifier, and the fifth message is used to request the storage apparatus for data flow characteristic information corresponding to the first identifier.

S430. The storage apparatus determines, according to the first identifier and the correspondence, the data flow characteristic information corresponding to the first identifier.

S440. The storage apparatus sends a sixth message to the PCEF, where the sixth message includes the data flow characteristic information corresponding to the first identifier.

Optionally, in an embodiment, the correspondence may include a correspondence between an identifier and application detection information.

In this embodiment of the present disclosure, the step S430 in which the storage apparatus determines, according to the first identifier and the correspondence, the data flow characteristic information corresponding to the first identifier may include: determining, by the storage apparatus according to the first identifier and the correspondence between an identifier and application detection information, application detection information corresponding to the first identifier, where the application detection information corresponding to the first identifier is used as the data flow characteristic information corresponding to the first identifier, and the application detection information corresponding to the first identifier is used to check whether a corresponding data packet belongs to an application corresponding to the first identifier.

Optionally, in an embodiment, the correspondence may include a correspondence between an identifier and at least one of 5-tuple information or a uniform resource locator URL.

In this embodiment of the present disclosure, the step S430 in which the storage apparatus determines, according to the first identifier and the correspondence, the data flow characteristic information corresponding to the first identifier includes: determining, by the storage apparatus according to the first identifier and the correspondence between an identifier and at least one of 5-tuple information or a URL, 5-tuple information and/or a URL corresponding to the first identifier, where the 5-tuple information and/or the URL corresponding to the first identifier is used as the data flow characteristic information corresponding to the first identifier.

In this embodiment of the present disclosure, preferably, the first identifier includes an application name.

According to the data packet processing method in this embodiment of the present disclosure, a storage apparatus disposed on a network side stores a correspondence between an identifier and data flow characteristic information. When configuring a policy for a data packet including a first identifier, a network-side device requests the storage apparatus for data flow characteristic information corresponding to the first identifier. This avoids transmitting a considerable amount of data flow characteristic information on an interface of an SCEF, and relieves load on the SCEF.

Figure 5:
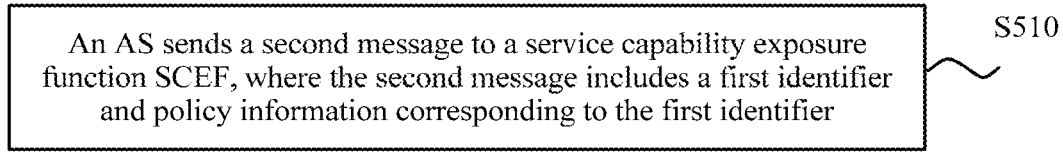
FIG. 5 is a schematic flowchart of a data packet processing method according to another embodiment of the present disclosure.

FIG. 5 is a schematic flowchart of a data packet processing method 500 according to an embodiment of the present disclosure. The method 500 is executed by an AS, and includes the following step:

S510. The AS sends a second message to a service capability exposure function SCEF, where the second message includes a first identifier and policy information corresponding to the first identifier.

Optionally, in an embodiment, the method 500 may further include: sending, by the AS, a first message to the SCEF, where the first message includes a correspondence between an identifier and data flow characteristic information.

Optionally, in an embodiment, the second message may further include a first user equipment UE list, and the first UE list includes at least two UEs.

Optionally, in an embodiment, the correspondence may include a correspondence between an identifier and application detection information.

Optionally, in another embodiment, the correspondence may include a correspondence between an identifier and at least one of 5-tuple information or a uniform resource locator URL.

Figure 6:
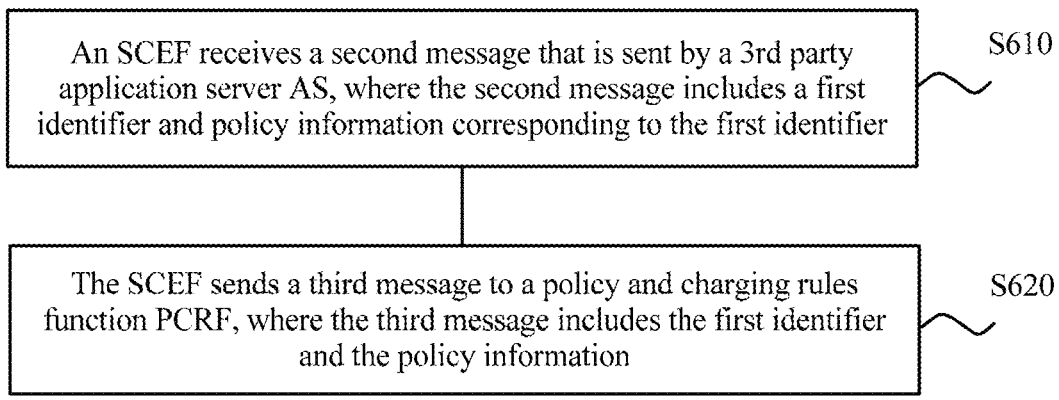
FIG. 6 is a schematic flowchart of a data packet processing method according to another embodiment of the present disclosure.

FIG. 6 is a schematic flowchart of a data packet processing method 600 according to an embodiment of the present disclosure. The method 600 is executed by an SCEF, and includes the following steps:

S610. The SCEF receives a second message that is sent by a 3rd party application server AS, where the second message includes a first identifier and policy information corresponding to the first identifier.

S620. The SCEF sends a third message to a policy and charging rules function PCRF, where the third message includes the first identifier and the policy information.

Optionally, in an embodiment, the second message may further include a first user equipment UE list, and the first UE list includes at least two UEs. The third message may further include a second UE list, and the second UE list includes at least one UE.

In this embodiment of the present disclosure, the first UE list and the second UE list may be identical.

In this embodiment of the present disclosure, optionally, the policy information may include at least one type of payer information, Quality of Service QoS information, or service chain information.

Optionally, in an embodiment, the method 600 may further include: receiving, by the SCEF, a first message that is sent by the AS, where the first message includes a correspondence between an identifier and data flow characteristic information; and sending, by the SCEF, the first message to the storage apparatus.

In this embodiment of the present disclosure, optionally, the correspondence may include a correspondence between an identifier and application detection information.

In this embodiment of the present disclosure, optionally, the correspondence may include a correspondence between an identifier and at least one of 5-tuple information or a uniform resource locator URL.

Figure 7:
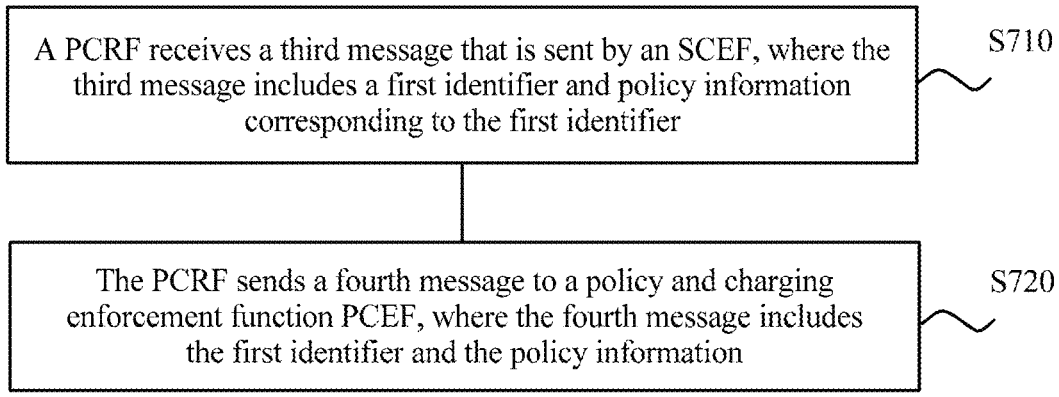
FIG. 7 is a schematic flowchart of a data packet processing method according to another embodiment of the present disclosure.

FIG. 7 is a schematic flowchart of a data packet processing method 700 according to an embodiment of the present disclosure. The method 700 is executed by a PCRF, and includes the following steps:

S710. The PCRF receives a third message that is sent by an SCEF, where the third message includes a first identifier and policy information corresponding to the first identifier.

S720. The PCRF sends a fourth message to a policy and charging enforcement function PCEF, where the fourth message includes the first identifier and the policy information.

Optionally, in an embodiment, the third message may further include a user equipment UE list. The step S720 in which the PCRF sends a fourth message to a policy and charging enforcement function PCEF may include: sending, by the PCRF, the fourth message to the PCEF according to the UE list, where the fourth message instructs to execute, according to the policy information, a policy on UE included in the UE list.

Figure 8:
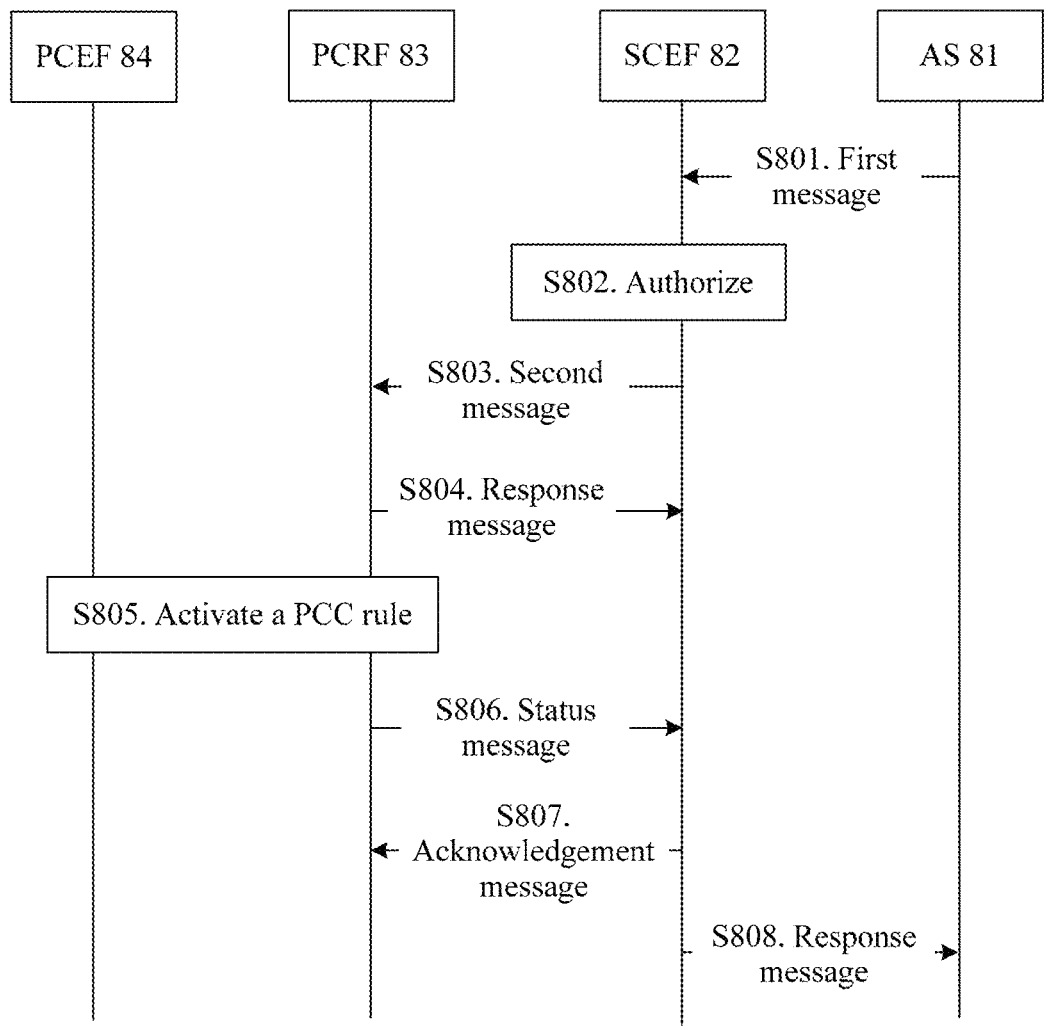
FIG. 8 is a schematic flowchart of a data packet processing method according to another embodiment of the present disclosure.

FIG. 8 shows a data packet processing method 800 according to an embodiment of the present disclosure. The method 800 includes the following steps.

S801. An AS 81 sends a first message to an SCEF 82, where the first message includes data flow information, policy information corresponding to the data flow information, and a first user equipment UE list, and the first UE list includes at least two UEs. The first message is used to request to execute a policy.

A charging procedure is used as an example. The first message is used for requesting to set a payer, and the first message includes payer information, 5-tuple information and/or a URL, and a first user equipment UE list. The first UE list includes at least two UEs. Specifically, that the policy information is applicable to all UEs may be indicated in a non-UE list manner, for example, indicated by "ALL users". A specific name is not limited.

In comparison with the prior art, information about the first UE list is added in the method 800 in this embodiment of the present disclosure. The first UE list is used to indicate user equipment for which a payment operation is performed by a payer on a data flow corresponding to 5-tuple information and/or a URL.

S802. The SCEF 82 may authorize a network side to execute a corresponding policy as requested in the first message. For example, when the policy information is used for executing the charging procedure, the SCEF 82 may authorize the AS 81 to perform data flow charging. It should be understood that in this embodiment of the present disclosure, the step S802 is optional, that is, this step may be omitted in specific implementation.

S803. The SCEF 82 sends a second message to a PCRF 83, where the second message includes the data flow information, the policy information corresponding to the data flow information, and a second UE list, and the second UE list includes at least one UE. Likewise, that the policy information is applicable to all UEs may be indicated in a non-UE list manner, for example, indicated by "ALL users". A specific name is not limited. Therefore, the PCRF, the PCEF, and the like execute, according to the second UE list, a policy on UE included in the second UE list. The second message is API request information requesting to set a charging party (sponsor information, IP filter information, UE list). The second message is used for requesting to set a payer, the second message includes payer information, 5-tuple information and/or a URL, and the second UE list, and the second UE list includes at least one UE, so that the PCRF performs, according to the second UE list, policy and charging control PCC on the UE included in the second UE list.

It should be understood that the foregoing process may occur in a network attachment process of first UE. At the same time, the AS 81 also notifies the PCRF 83 of information about another UE (in the UE list) by using the SCEF 82, so that the PCRF 83 performs a charging operation on a data flow identified by a data flow identifier for all UEs in the UE list. In this case, the SCEF 82 notifies all PCRFs 83 of the UE list. That is, the first UE list and the second UE list may be identical.

It should be understood that the foregoing process may occur after attachment of UE is complete. When data flow characteristic information or policy information needs to be modified, the SCEF determines a PCRF in which UE in the UE list is located, and then separately sends different second messages to different PCRFs in which different UEs are located. In this case, the UE included in the second UE list in the second message is attached to the PCRF 83, and all UEs included in the second UE list are included in the first UE list. The first UE list further includes UE attached to a PCRF other than the PCRF 83.

S804. The PCRF 83 sends a response message to the SCEF 82.

S805. The PCRF 83 performs, according to the second UE list, PCC on the UE included in the second UE list.

S806. The PCRF 83 sends a status message to the SCEF 82.

S807. The SCEF 82 sends an ACK message to the PCRF 83.

S808. The SCEF 82 sends an API response message to the AS 81.

According to the data packet processing method in this embodiment of the present disclosure, in a data packet processing process, an AS sends data flow information of multiple UEs and corresponding policy information to a network-side device at a time by using an SCEF. This avoids transmitting a considerable amount of data flow characteristic information on an interface of the SCEF, and relieves load on the SCEF.

The foregoing describes in detail the data packet processing method in another embodiment of the present disclosure from a perspective of an entire procedure. The following separately describes a data packet processing method in embodiments of the present disclosure from perspectives of execution bodies of the method.

FIG. 9 is a schematic flowchart of a data packet processing method 900 according to another embodiment of the present disclosure. The method 900 is executed by an SCEF, and includes the following steps:

S910. The SCEF receives a first message that is sent by an AS, where the first message includes data flow information, policy information corresponding to the data flow information, and a first user equipment UE list, and the first UE list includes at least two UEs.

S920. The SCEF sends a second message to a policy and charging rules function PCRF, where the second message includes the data flow information, the policy information, and a second UE list, and the second UE list includes at least one UE, so that the PCRF executes, according to the second UE list, a policy corresponding to the policy information on UE included in the second UE list.

Optionally, in an embodiment, the first UE list and the second UE list may be identical.

According to the data packet processing method in this embodiment of the present disclosure, in a data packet processing process, an AS sends data flow information of multiple UEs and corresponding policy information to a network-side device at a time by using an SCEF. This avoids transmitting a considerable amount of data flow characteristic information on an interface of the SCEF, and relieves load on the SCEF.

FIG. 10 is a schematic flowchart of a data packet processing method 1000 according to another embodiment of the present disclosure. The method 1000 is executed by an AS, and includes the following step:

S1010. The AS sends a first message to a service capability exposure function SCEF, where the first message includes data flow information, policy information corresponding to the data flow information, and a first user equipment UE list, and the first UE list includes at least two UEs.

According to the data packet processing method in this embodiment of the present disclosure, in a data packet processing process, an AS sends data flow information of multiple UEs and corresponding policy information to a network-side device at a time by using an SCEF. This avoids transmitting a considerable amount of data flow characteristic information on an interface of the SCEF, and relieves load on the SCEF.

FIG. 11 is a schematic flowchart of a data packet processing method 1100 according to another embodiment of the present disclosure. The method 1100 is executed by a PCRF, and includes the following steps:

S1110. The PCRF receives a second message that is sent by a service capability exposure function SCEF, where the second message includes the data flow information, policy information corresponding to the data flow information, and a second UE list, and the second UE list includes at least one UE.

S1120. The PCRF executes, according to the second UE list, a policy corresponding to the policy information on UE included in the second UE list.

According to the data packet processing method in this embodiment of the present disclosure, in a data packet processing process, an AS sends data flow information of multiple UEs and corresponding policy information to a network-side device at a time by using an SCEF. This avoids transmitting a considerable amount of data flow characteristic information on an interface of the SCEF, and relieves load on the SCEF.

It should be understood that although the embodiments of the present disclosure are described by using a charging procedure as an example, the solutions of the present disclosure may be used to execute various policies. For example, a Quality of Service (QoS) policy, a service chain policy, and the like may further be executed.

The QoS policy is a policy of maintaining service quality control on different UEs or different data. Formulated for a data flow, the service chain policy is a processing sequence of service functions that the data flow needs to visit. A service function that a data flow needs to visit and a sequence of service functions that need to be visited are defined as a service chain. For example, (anti-virus, firewall, NAT address translation), (application caching and acceleration, firewall, NAT address translation), and (firewall, NAT address translation, anti-virus) belong to different service chains. Therefore, the data flow can be sent, according to the service chain, to a processing device for a service function that the data flow needs to visit correspondingly. For specific content of QoS information and service chain information, refer to an existing standard and technology. The embodiments of the present disclosure are not limited thereto, and details are not described herein.

In the embodiments of the present disclosure, during execution of one or more policies, policy information may include at least one type of payer information, QoS information, or service chain information.

It should be understood that sequence numbers of the foregoing processes do not mean execution sequences in the embodiments of the present disclosure. The execution sequences of the processes should be determined according to functions and internal logic of the processes, and should not be construed as any limitation on the implementation processes of the embodiments of the present disclosure.

The foregoing describes in detail the data packet processing method in the embodiments of the present disclosure. The following describes a data packet processing apparatus in embodiments of the present disclosure.

Figure 12:
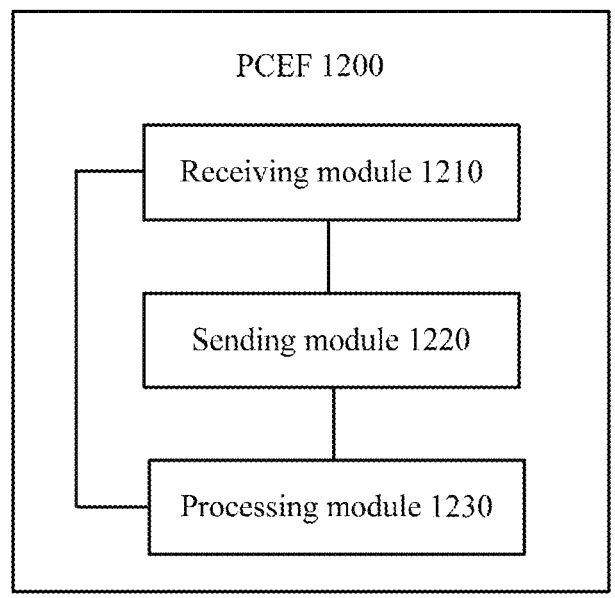
FIG. 12 is a schematic block diagram of a PCEF according to an embodiment of the present disclosure.

FIG. 12 is a schematic block diagram of a PCEF 1200 according to an embodiment of the present disclosure. The PCEF 1200 includes a receiving module 1210, a sending module 1220, and a processing module 1230.

The receiving module 1210 is configured to receive a fourth message that is sent by a policy and charging rules function PCRF, and the fourth message includes a first identifier and policy information corresponding to the first identifier.

The sending module 1220 is configured to send a fifth message to a storage apparatus, and the fifth message includes the first identifier. The storage apparatus stores a correspondence between an identifier and data flow characteristic information, and the fifth message is used to request the storage apparatus for data flow characteristic information corresponding to the first identifier.

The receiving module 1210 is further configured to receive a sixth message that is sent by the storage apparatus, and the sixth message includes the data flow characteristic information corresponding to the first identifier.

The receiving module 1210 is further configured to receive a data packet that is sent by user equipment UE.

The processing module 1230 is configured to match information carried in the data packet against the data flow characteristic information.

The processing module 1230 is further configured to execute a policy on the data packet according to the policy information when the information carried in the data packet received by the receiving module matches the data flow characteristic information.

Optionally, in an embodiment, the data flow characteristic information corresponding to the first identifier may include 5-tuple information and/or a uniform resource locator URL corresponding to the first identifier, and the processing module 1230 is specifically configured to:

determine whether 5-tuple information and/or a URL included in the data packet is the 5-tuple information and/or the URL corresponding to the first identifier.

If the 5-tuple information and/or the URL included in the data packet is the 5-tuple information and/or the URL corresponding to the first identifier, the PCEF executes the policy on the data packet according to the policy information.

Optionally, in an embodiment, the data flow characteristic information corresponding to the first identifier may include application detection information corresponding to the first identifier, and the processing module 1230 is specifically configured to:

check the data packet according to the application detection information corresponding to the first identifier, and determine whether the data packet belongs to an application corresponding to the first identifier.

The PCEF executes the policy on the data packet according to the policy information if the data packet belongs to the application corresponding to the first identifier.

Optionally, in an embodiment, the PCEF 1200 may further include a processing module, configured to:

before the sending module sends the fifth message to the storage apparatus, determine that the data flow characteristic information corresponding to the first identifier is not locally stored.

In this embodiment of the present disclosure, the first identifier may include an application name.

Figure 13:
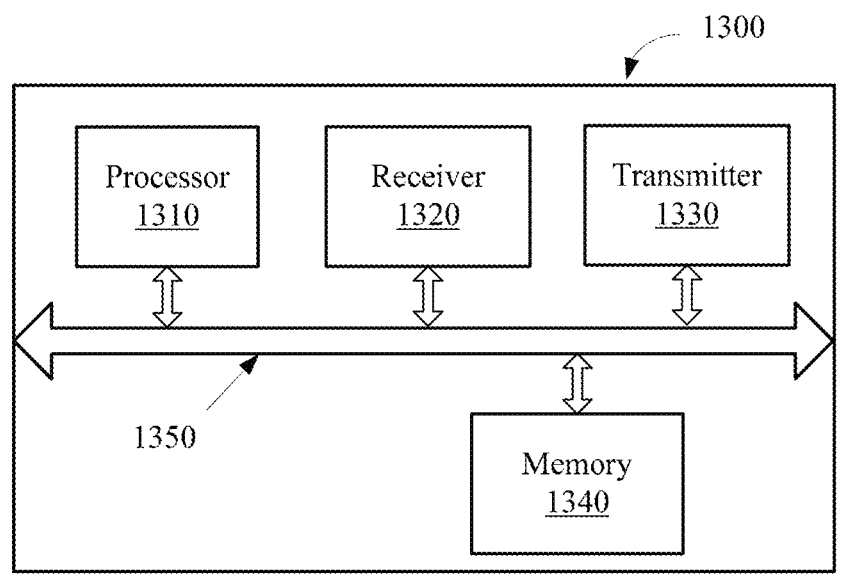
FIG. 13 is a schematic block diagram of a PCEF according to another embodiment of the present disclosure.

It should be noted that in this embodiment of the present disclosure, the receiving module 1210 may be implemented by a receiver, and the sending module 1220 may be implemented by a transmitter. As shown in FIG. 13, a PCEF 1300 may include a processor 1310, a receiver 1320, a transmitter 1330, and a memory 1340. The memory 1340 may be configured to store code executed by the processor 1310, and the like.

Components in the PCEF 1300 are coupled together by using a bus system 1350. In addition to a data bus, the bus system 1350 further includes a power supply bus, a control bus, and a status signal bus.

The PCEF 1200 shown in FIG. 12 or the PCEF 1300 shown in FIG. 13 can implement the processes implemented in the embodiments of FIG. 2 to FIG. 7 described above. To avoid repetition, details are not described herein again.

It should be noted that the foregoing method embodiments of the present disclosure may be applied to a processor, or be implemented by a processor. The processor may be an integrated circuit chip and has a signal processing capability. In an implementation process, the steps in the foregoing method embodiments may be completed by using an integrated logic circuit of hardware in the processor or instructions in a form of software. The processor may be a general-purpose processor, a digital signal processor (DSP), an application-specific integrated circuit (ASIC), a field programmable gate array (FPGA) or another programmable logic component, a discrete gate or a transistor logic component, or a discrete hardware component. The processor may implement or execute various methods, steps, and logical block diagrams disclosed in the embodiments of the present disclosure. The general-purpose processor may be a microprocessor, or the processor may be any conventional processor or the like. The steps of the method disclosed in the embodiments of the present disclosure may be directly executed and completed by a hardware decoding processor, or executed and completed by means of a combination of hardware and software modules in a decoding processor. The software module may be located in any mature storage medium in the field such as a random access memory, a flash memory, a read-only memory, a programmable read-only memory, an electrically erasable programmable memory, or a register. The storage medium is located in the memory, and the processor reads information in the memory and completes the steps of the foregoing method in combination with hardware of the processor.

It may be understood that the memory in this embodiment of the present disclosure may be a volatile memory, or may be a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and the random access memory is used as an external cache. By way of example and not limitation, RAMs of many forms are applicable, such as a static random access memory (Static RAM, SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification aims to include but is not limited to these memories and any memory of another proper type.

Figure 14:
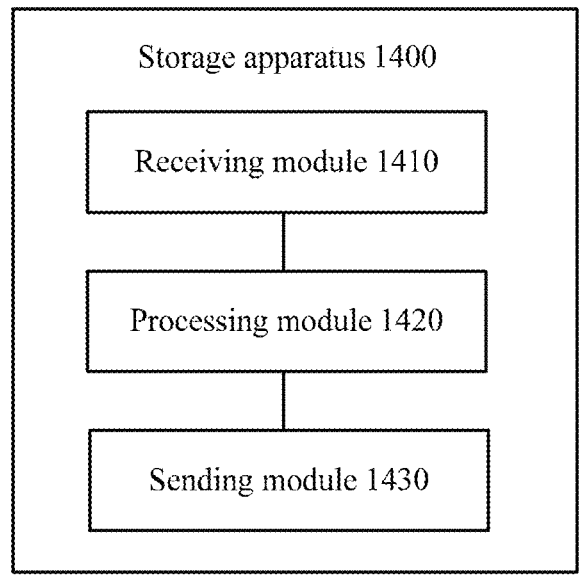
FIG. 14 is a schematic block diagram of a storage apparatus according to an embodiment of the present disclosure.

FIG. 14 is a schematic block diagram of a storage apparatus 1400 according to an embodiment of the present disclosure. The storage apparatus 1400 includes:

a receiving module 1410, configured to receive a first message that is sent by a 3rd party application server AS by using a service capability exposure function SCEF, where the first message includes information indicating a correspondence between an identifier and data flow characteristic information; where the receiving module 1410 is further configured to receive a fifth message that is sent by a policy and charging enforcement function PCEF, where the fifth message includes a first identifier, and the fifth message is used to request the storage apparatus for data flow characteristic information corresponding to the first identifier;

a processing module 1420, configured to determine, according to the first identifier and the correspondence, the data flow characteristic information corresponding to the first identifier; and a sending module 1430, configured to send a sixth message to the PCEF, where the sixth message includes the data flow characteristic information corresponding to the first identifier.

Optionally, in an embodiment, the correspondence may include a correspondence between an identifier and application detection information.

Optionally, in an embodiment, the processing module 1420 may be specifically configured to:

determine, according to the first identifier and the correspondence between an identifier and application detection information, application detection information corresponding to the first identifier, where the application detection information corresponding to the first identifier is used as the data flow characteristic information corresponding to the first identifier, and the application detection information corresponding to the first identifier is used to check whether a corresponding data packet belongs to an application corresponding to the first identifier.

Optionally, in an embodiment, the correspondence may include a correspondence between an identifier and at least one of 5-tuple information or a uniform resource locator URL.

Optionally, in an embodiment, the processing module 1420 may be specifically configured to:

determine, according to the first identifier and the correspondence between an identifier and at least one of 5-tuple information or a URL, 5-tuple information and/or a URL corresponding to the first identifier, where the 5-tuple information and/or the URL corresponding to the first identifier is used as the data flow characteristic information corresponding to the first identifier.

In this embodiment of the present disclosure, the first identifier may include an application name.

Figure 15:
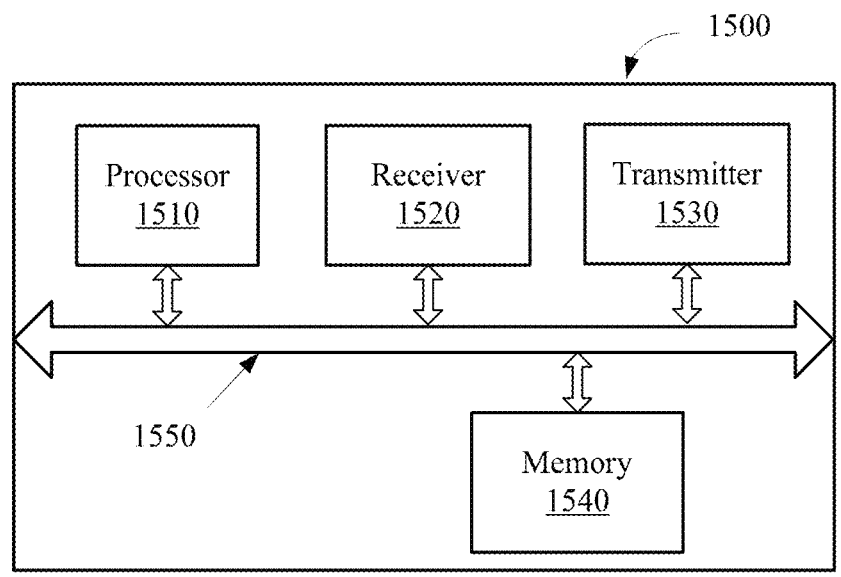
FIG. 15 is a schematic block diagram of a storage apparatus according to another embodiment of the present disclosure.

It should be noted that in this embodiment of the present disclosure, the receiving module 1410 may be implemented by a receiver, the sending module 1430 may be implemented by a transmitter, and the processing module 1420 may be implemented by a processor. As shown in FIG. 15, a storage apparatus 1500 may include a processor 1510, a receiver 1520, a transmitter 1530, and a memory 1540. The memory 1540 may be configured to store code executed by the processor 1510, and the like.

All components in the storage apparatus 1500 are coupled together by using the bus system 1550. In addition to a data bus, the bus system 1550 further includes a power supply bus, a control bus, and a status signal bus.

The storage apparatus 1400 shown in FIG. 14 or the storage apparatus 1500 shown in FIG. 15 can implement the processes implemented in the embodiments of FIG. 2 to FIG. 7 described above. To avoid repetition, details are not described herein again.

Figure 16:
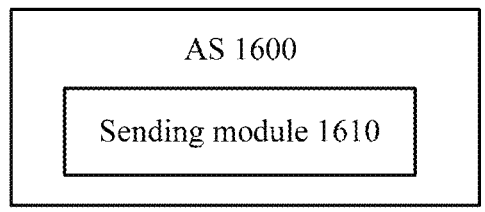
FIG. 16 is a schematic block diagram of an AS according to an embodiment of the present disclosure.

FIG. 16 is a schematic block diagram of an AS 1600 according to an embodiment of the present disclosure. The AS 1600 includes:

a sending module 1610, configured to send a second message to a service capability exposure function SCEF, where the second message includes a first identifier and policy information corresponding to the first identifier.

Optionally, in an embodiment, the sending module 1610 may further be configured to:

send a first message to the SCEF, where the first message includes a correspondence between an identifier and data flow characteristic information.

Optionally, in an embodiment, the second message may further include a first user equipment UE list, and the first UE list includes at least two UEs.

Optionally, in an embodiment, the correspondence may include a correspondence between an identifier and application detection information.

Optionally, in an embodiment, the correspondence may include a correspondence between an identifier and at least one of 5-tuple information or a uniform resource locator URL.

Figure 17:
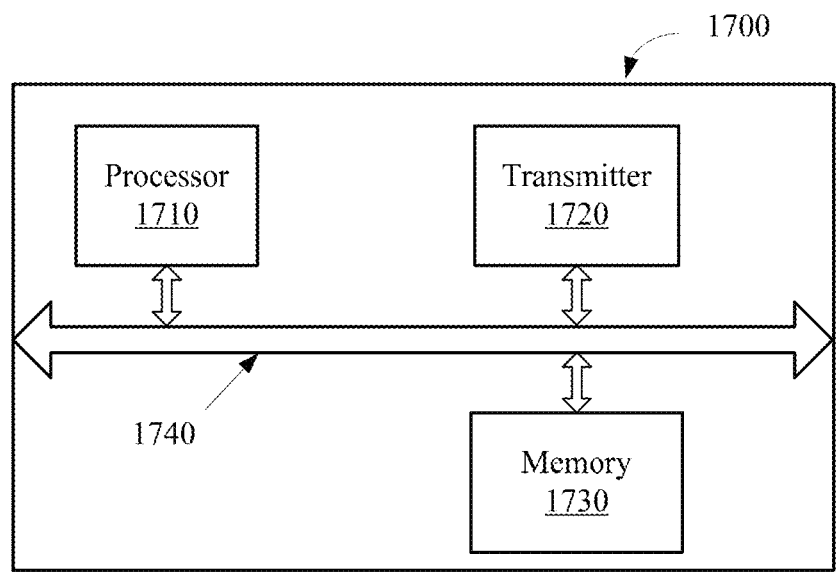
FIG. 17 is a schematic block diagram of an AS according to another embodiment of the present disclosure.

It should be noted that in this embodiment of the present disclosure, the sending module 1610 may be implemented by a transmitter. As shown in FIG. 17, an AS 1700 may include a processor 1710, a transmitter 1720, and a memory 1730. The memory 1730 may be configured to store code executed by the processor 1710, and the like.

Components in the AS 1700 are coupled together by using a bus system 1740. In addition to a data bus, the bus system 1740 further includes a power supply bus, a control bus, and a status signal bus.

The AS 1600 shown in FIG. 16 or the AS 1700 shown in FIG. 17 can implement the processes implemented in the embodiments of FIG. 2 to FIG. 7 described above. To avoid repetition, details are not described herein again.

Figure 18:
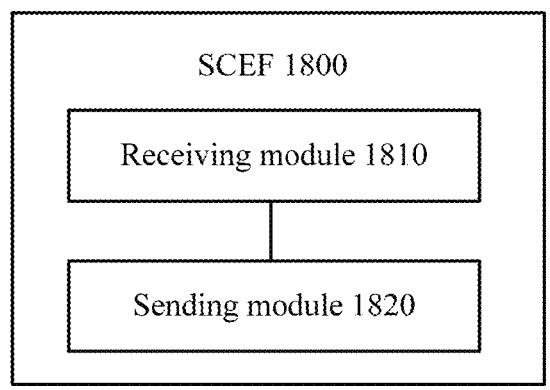
FIG. 18 is a schematic block diagram of an SCEF according to an embodiment of the present disclosure.

FIG. 18 is a schematic block diagram of an SCEF 1800 according to an embodiment of the present disclosure. The SCEF 1800 includes:

a receiving module 1810, configured to receive a second message that is sent by a 3rd party application server AS, where the second message includes a first identifier and policy information corresponding to the first identifier; and a sending module 1820, configured to send a third message to a policy and charging rules function PCRF, where the third message includes the first identifier and the policy information.

Optionally, in an embodiment, the second message may further include a first user equipment UE list, and the first UE list includes at least two UEs.

The third message further includes a second UE list, and the second UE list includes at least one UE.

Optionally, in an embodiment, the first UE list and the second UE list may be identical.

Optionally, in an embodiment, the receiving module 1810 may further be configured to:

receive a first message that is sent by the AS, where the first message includes a correspondence between an identifier and data flow characteristic information.

The sending module 1820 is further configured to:

send the first message to the storage apparatus.

Optionally, in an embodiment, the correspondence may include a correspondence between an identifier and application detection information.

Optionally, in an embodiment, the correspondence may include a correspondence between an identifier and at least one of 5-tuple information or a uniform resource locator URL.

Figure 19:
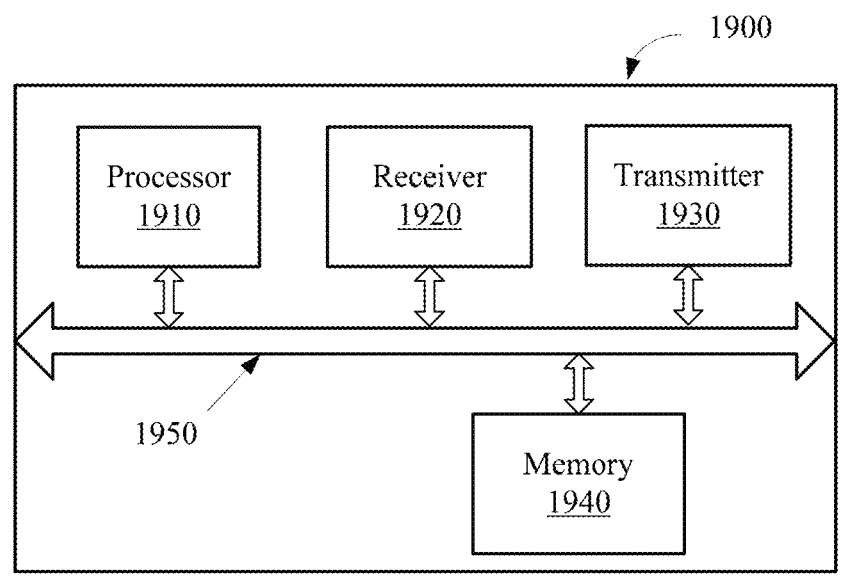
FIG. 19 is a schematic block diagram of an SCEF according to another embodiment of the present disclosure.

It should be noted that in this embodiment of the present disclosure, the receiving module 1810 may be implemented by a receiver, and the sending module 1820 may be implemented by a transmitter. As shown in FIG. 19, an SCEF 1900 may include a processor 1910, a receiver 1920, a transmitter 1930, and a memory 1940. The memory 1940 may be configured to store code executed by the processor 1910, and the like.

Components in the SCEF 1900 are coupled together by using a bus system 1950. In addition to a data bus, the bus system 1950 further includes a power supply bus, a control bus, and a status signal bus.

The SCEF 1800 shown in FIG. 18 or the SCEF 1900 shown in FIG. 19 can implement the processes implemented in the embodiments of FIG. 2 to FIG. 7 described above. To avoid repetition, details are not described herein again.

Figure 20:
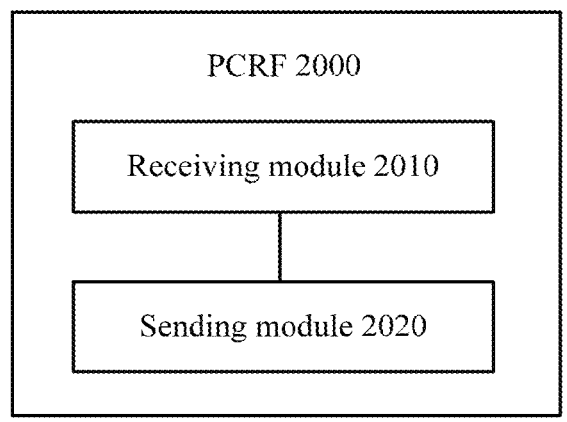
FIG. 20 is a schematic block diagram of a PCRF according to an embodiment of the present disclosure.

FIG. 20 is a schematic block diagram of a PCRF 2000 according to an embodiment of the present disclosure. The PCRF 2000 includes:

a receiving module 2010, configured to receive a third message that is sent by a service capability exposure function SCEF, where the third message includes a first identifier and policy information corresponding to the first identifier; and a sending module 2020, configured to send a fourth message to a policy and charging enforcement function PCEF, where the fourth message includes the first identifier and the policy information.

Optionally, in an embodiment, the third message may further include a user equipment UE list, and the sending module 2020 may be specifically configured to:

send the fourth message to the PCEF according to the UE list, where the fourth message instructs to execute, according to the policy information, a policy on UE included in the UE list.

Figure 21:
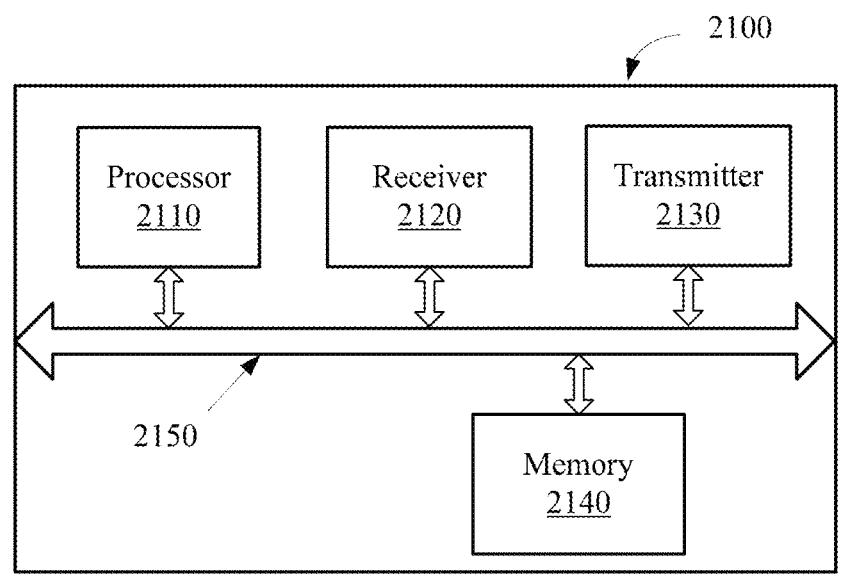
FIG. 21 is a schematic block diagram of a PCRF according to another embodiment of the present disclosure.

It should be noted that in this embodiment of the present disclosure, the receiving module 2010 may be implemented by a receiver, and the sending module 2020 may be implemented by a transmitter. As shown in FIG. 21, a PCRF 2100 may include a processor 2110, a receiver 2120, a transmitter 2130, and a memory 2140. The memory 2140 may be configured to store code executed by the processor 2110, and the like.

Components in the PCRF 2100 are coupled together by using a bus system 2150. In addition to a data bus, the bus system 2150 further includes a power supply bus, a control bus, and a status signal bus.

The PCRF 2000 shown in FIG. 20 or the PCRF 2100 shown in FIG. 21 can implement the processes implemented in the embodiments of FIG. 2 to FIG. 7 described above. To avoid repetition, details are not described herein again.

An embodiment of the present disclosure further provides a system including a storage apparatus, a policy and charging enforcement function PCEF, a service capability exposure function SCEF, and a policy and charging rules function PCRF. The system may further include a 3rd party application server AS. The storage apparatus, the PCEF, the SCEF, the PCRF, and the AS are respectively corresponding to the corresponding apparatuses, functions, or devices in the foregoing embodiments of FIG. 2 to FIG. 7, or may be corresponding to the corresponding apparatuses, functions, or devices in FIG. 12 to FIG. 21. To avoid repetition, details are not described herein again.

Figure 22:
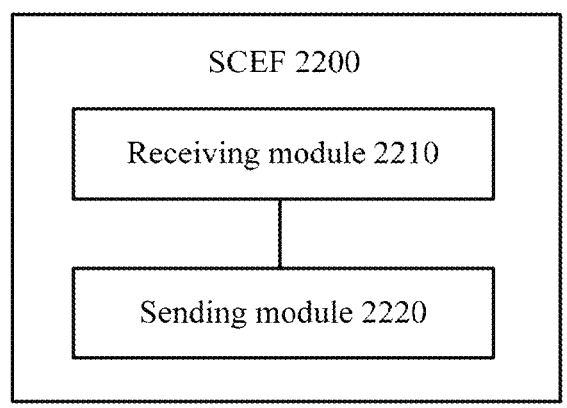
FIG. 22 is a schematic block diagram of an SCEF according to another embodiment of the present disclosure.

FIG. 22 is a schematic block diagram of an SCEF 2200 according to another embodiment of the present disclosure. The SCEF 2200 includes:

a receiving module 2210, configured to receive a first message that is sent by a 3rd party application server AS, where the first message includes data flow information, policy information corresponding to the data flow information, and a first user equipment UE list, and the first UE list includes at least two UEs; and a sending module 2220, configured to send a second message to a policy and charging rules function PCRF, where the second message includes the data flow information, the policy information, and a second UE list, and the second UE list includes at least one UE, so that the PCRF executes, according to the second UE list, a policy corresponding to the policy information on UE included in the second UE list.

Optionally, in an embodiment, the first UE list and the second UE list may be identical.

Figure 23:
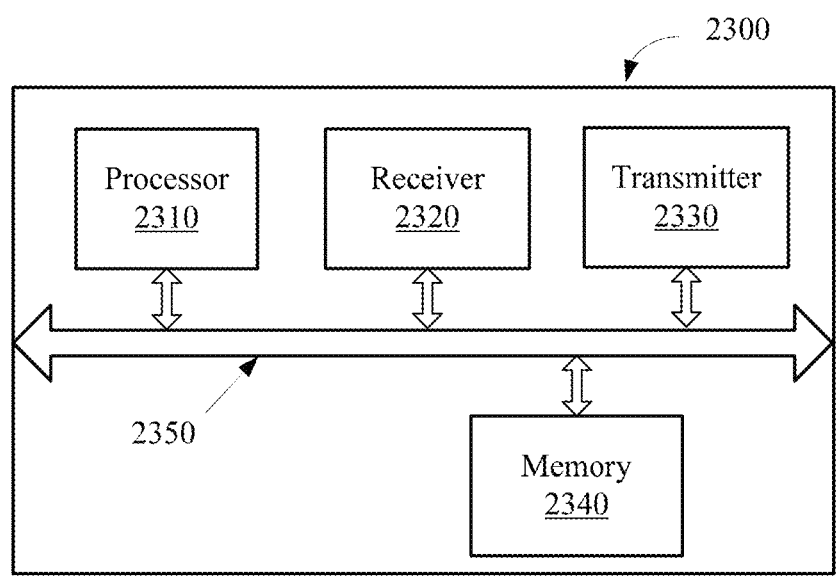
FIG. 23 is a schematic block diagram of an SCEF according to another embodiment of the present disclosure.

It should be noted that in this embodiment of the present disclosure, the receiving module 2210 may be implemented by a receiver, and the sending module 2220 may be implemented by a transmitter. As shown in FIG. 23, an SCEF 2300 may include a processor 2310, a receiver 2320, a transmitter 2330, and a memory 2340. The memory 2340 may be configured to store code executed by the processor 2310, and the like.

Components in the SCEF 2300 are coupled together by using a bus system 2350. In addition to a data bus, the bus system 2350 further includes a power supply bus, a control bus, and a status signal bus.

The SCEF 2200 shown in FIG. 22 or the SCEF 2300 shown in FIG. 23 can implement the processes implemented in the embodiments of FIG. 8 to FIG. 11 described above. To avoid repetition, details are not described herein again.

Figure 24:
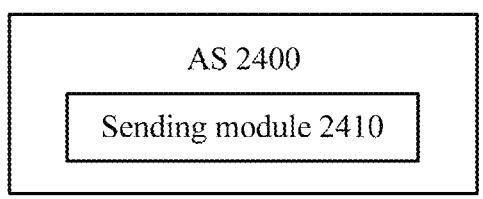
FIG. 24 is a schematic block diagram of an AS according to another embodiment of the present disclosure.

FIG. 24 is a schematic block diagram of an AS 2400 according to another embodiment of the present disclosure. The AS 2400 includes:

a sending module 2410, configured to send a first message to a service capability exposure function SCEF, where the first message includes data flow information, policy information corresponding to the data flow information, and a first user equipment UE list, and the first UE list includes at least two UEs.

Figure 25:
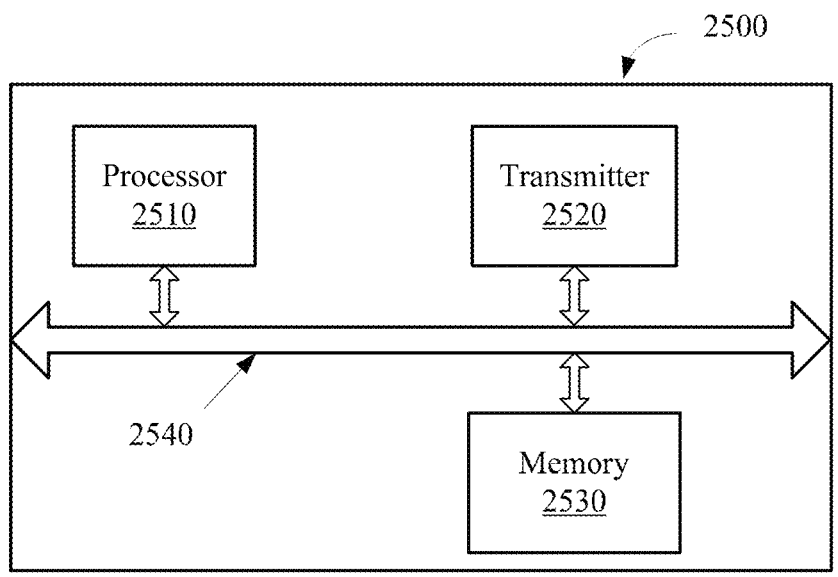
FIG. 25 is a schematic block diagram of an AS according to another embodiment of the present disclosure.

It should be noted that in this embodiment of the present disclosure, the sending module 2410 may be implemented by a transmitter. As shown in FIG. 25, an AS 2500 may include a processor 2510, a transmitter 2520, and a memory 2530. The memory 2530 may be configured to store code executed by the processor 2510, and the like.

Components in the AS 2500 are coupled together by using a bus system 2540. In addition to a data bus, the bus system 2540 further includes a power supply bus, a control bus, and a status signal bus.

The AS 2400 shown in FIG. 24 or the AS 2500 shown in FIG. 25 can implement the processes implemented in the embodiments of FIG. 8 to FIG. 11 described above. To avoid repetition, details are not described herein again.

Figure 26:
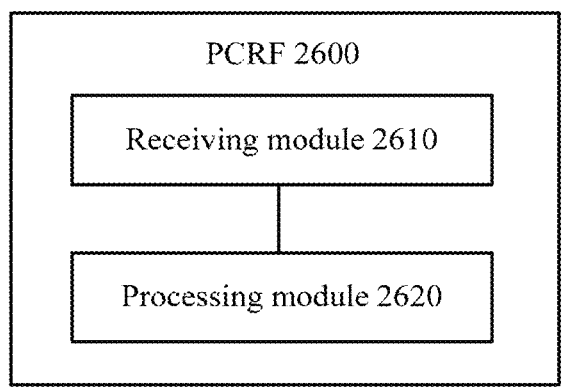
FIG. 26 is a schematic block diagram of a PCRF according to another embodiment of the present disclosure.

FIG. 26 is a schematic block diagram of a PCRF 2600 according to another embodiment of the present disclosure. The PCRF 2600 includes:

a receiving module 2610, configured to receive a second message that is sent by a service capability exposure function SCEF, where the second message includes the data flow information, policy information corresponding to the data flow information, and a second UE list, and the second UE list includes at least one UE; and a processing module 2620, configured to execute, according to the second UE list, a policy corresponding to the policy information on UE included in the second UE list.

Figure 27:
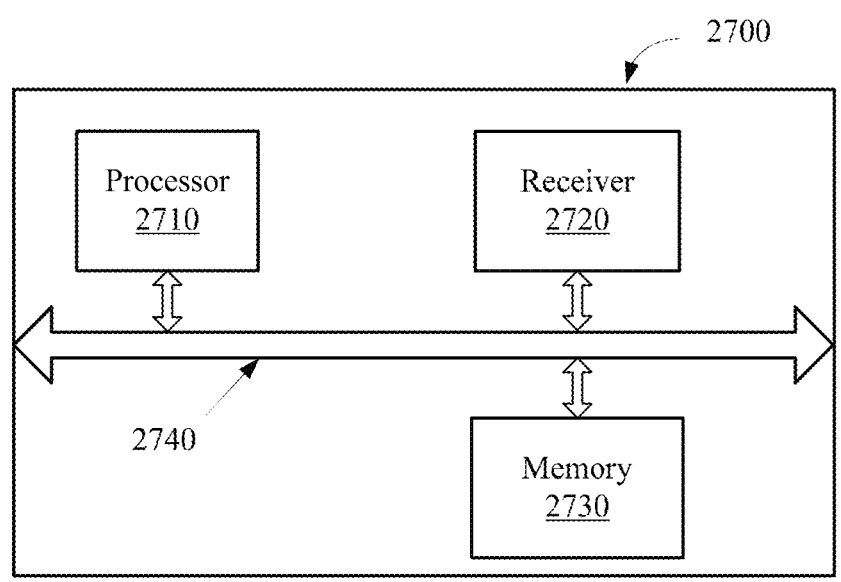
FIG. 27 is a schematic block diagram of a PCRF according to another embodiment of the present disclosure.

It should be noted that in this embodiment of the present disclosure, the receiving module 2610 may be implemented by a receiver, and the processing module 2620 may be implemented by a processor. As shown in FIG. 27, a PCRF 2700 may include a processor 2710, a receiver 2720, and a memory 2730. The memory 2730 may be configured to store code executed by the processor 2710, and the like.

Components in the PCRF 2700 are coupled together by using a bus system 2740. In addition to a data bus, the bus system 2740 further includes a power supply bus, a control bus, and a status signal bus.

The PCRF 2600 shown in FIG. 26 or the PCRF 2700 shown in FIG. 27 can implement the processes implemented in the embodiments of FIG. 8 to FIG. 11 described above. To avoid repetition, details are not described herein again.

An embodiment of the present disclosure further provides a system including a 3rd party application server AS, a service capability exposure function SCEF, and a policy and charging rules function PCRF. The system may further include a policy and charging enforcement function PCEF. The PCEF, the SCEF, the PCRF, and the AS are respectively corresponding to the corresponding apparatuses, functions, or devices in the foregoing embodiments of FIG. 8 to FIG. 11, or may be corresponding to the corresponding apparatuses, functions, or devices in FIG. 22 to FIG. 27. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data packet processing method, the method comprising:
    receiving, by a storage apparatus, information indicating a correspondence between an identifier and data flow characteristic information from an application server (AS);
    receiving, by the storage apparatus, a message from a policy and charging enforcement function (PCEF), wherein the message comprises a first identifier, and the message is used to request the storage apparatus for data flow characteristic information corresponding to the first identifier;
    determining, by the storage apparatus according to the first identifier and the correspondence, the data flow characteristic information corresponding to the first identifier; and
    sending, by the storage apparatus, a sixth message to the PCEF, wherein the second message comprises the data flow characteristic information corresponding to the first identifier.

2. The method according to claim 1, wherein the correspondence comprises a correspondence between an identifier and at least one of 5-tuple information or a uniform resource locator (URL).

3. The method according to claim 2, wherein determining, by the storage apparatus according to the first identifier and the correspondence, the data flow characteristic information corresponding to the first identifier comprises:
    determining, by the storage apparatus according to the first identifier and the correspondence between an identifier and at least one of 5-tuple information or a URL, 5-tuple information and/or a URL corresponding to the first identifier, wherein the 5-tuple information and/or the URL corresponding to the first identifier is used as the data flow characteristic information corresponding to the first identifier.

4. The method according to claim 1, wherein the first identifier comprises an application name.

5. A data packet processing method, comprising:
receiving, by a policy and charging enforcement function (PCEF), a message from a policy and charging rules function (PCRF), wherein the message comprises a first identifier and policy information corresponding to the first identifier;
sending, by the PCEF, a second message to a storage apparatus for requesting the storage apparatus for data flow characteristic information corresponding to the first identifier, wherein the second message comprises the first identifier, and the storage apparatus is configured to store a correspondence between an identifier and data flow characteristic information; and
receiving, by the PCEF, a third message from the storage apparatus, wherein the third message comprises the data flow characteristic information corresponding to the first identifier.

6. The method according to claim 5, further comprising:
receiving, by the PCEF, a data packet from a user equipment (UE); matching information carried in the data packet against the data flow characteristic information; and
executing, by the PCEF, a policy on the data packet according to the policy information when the information carried in the data packet matches the data flow characteristic information.

7. The method according to claim 6, wherein the data flow characteristic information corresponding to the first identifier comprises 5-tuple information and/or a uniform resource locator (URL) corresponding to the first identifier, and the method further comprises:
determining, by the PCEF, whether 5-tuple information and/or a URL comprised in the data packet is the 5-tuple information and/or the URL corresponding to the first identifier; and
when the PCEF determines that the 5-tuple information and/or the URL comprised in the data packet is the 5-tuple information and/or the URL corresponding to the first identifier, executing, by the PCEF, the policy on the data packet according to the policy information.

8. The method according to claim 7, wherein the policy information comprises at least one type of payer information, Quality of Service (QoS) information, or service chain information.

9. The method according to claim 5, wherein the first identifier comprises an application name.

10. A storage apparatus, comprising:
a processor, and
a non-transitory computer-readable storage medium storing a program to be executed by the processor, the program including instructions for:
receiving information indicating a correspondence between an identifier and data flow characteristic information from an application server (AS);
receiving a message from a policy and charging enforcement function (PCEF), wherein the fifth message comprises a first identifier, and the fifth message is used to request the storage apparatus for data flow characteristic information corresponding to the first identifier,
determining, according to the first identifier and the correspondence, the data flow characteristic information corresponding to the first identifier, and
sending a second message to the PCEF, wherein the second message comprises the data flow characteristic information corresponding to the first identifier.

11. The storage apparatus according to claim 10, wherein the correspondence comprises a correspondence between an identifier and at least one of 5-tuple information or a uniform resource locator (URL).

12. The storage apparatus according to claim 11, wherein the program further includes instructions for:
determining, according to the first identifier and the correspondence between an identifier and at least one of 5-tuple information or a URL, 5-tuple information and/or a URL corresponding to the first identifier, wherein the 5-tuple information and/or the URL corresponding to the first identifier is used as the data flow characteristic information corresponding to the first identifier.

13. The storage apparatus according to claim 10, wherein the first identifier comprises an application name.

14. A policy and charging enforcement function (PCEF), comprising
a processor, and
a non-transitory computer-readable storage medium storing a program to be executed by the processor, the program including instructions for:
receiving a message from a policy and charging rules function (PCRF), wherein the fourth message comprises a first identifier and policy information corresponding to the first identifier;
sending a second message to a storage apparatus for requesting the storage apparatus for data flow characteristic information corresponding to the first identifier, wherein the fifth message comprises the first identifier, and the storage apparatus is configured to store a correspondence between an identifier and data flow characteristic information; and
receiving a third message from the storage apparatus, wherein the third message comprises the data flow characteristic information corresponding to the first identifier.

15. The PCEF according to claim 14, wherein the program further includes instructions for:
receiving a data packet from a user equipment UE;
matching information carried in the data packet against the data flow characteristic information; and
executing a policy on the data packet according to the policy information when the information carried in the data packet received by the receiving module matches the data flow characteristic information.

16. The PCEF according to claim 15, wherein the data flow characteristic information corresponding to the first identifier comprises 5-tuple information and/or a uniform resource locator (URL) corresponding to the first identifier, and the program includes instructions for:
determining whether 5-tuple information and/or a URL comprised in the data packet is the 5-tuple information and/or the URL corresponding to the first identifier; and
when the 5-tuple information and/or the URL comprised in the data packet is the 5-tuple information and/or the URL corresponding to the first identifier, the PCEF executing the policy on the data packet according to the policy information.

17. The PCEF according to claim 14, wherein the policy information comprises at least one type of payer information, Quality of Service (QoS) information, or service chain information.

18. The PCEF according to claim 14, wherein the first identifier comprises an application name.

19. A service capability exposure function (SCEF), comprising:
- a processor, and
- a non-transitory computer-readable storage medium storing a program to be executed by the processor, the program including instructions for:
  - receiving a message from an application server (AS), wherein the second message comprises a first identifier and policy information corresponding to the first identifier, and
  - sending a second message to a policy and charging rules function (PCRF), wherein the second message comprises the first identifier and the policy information.

20. The SCEF according to claim 19, wherein the correspondence comprises a correspondence between an identifier and at least one of 5-tuple information or a uniform resource locator (URL).

* * * * *

UNITED STATES PATENT AND TRADEMARK OFFICE
CERTIFICATE OF CORRECTION

PATENT NO. : 10,581,623 B2  
APPLICATION NO. : 16/024234  
DATED : March 3, 2020  
INVENTOR(S) : Wei Lu and Huan Li Page 1 of 1

It is certified that error appears in the above-identified patent and that said Letters Patent is hereby corrected as shown below:

In the Claims

Claim 10, Column 29, Line 63: "the fifth message" should read "the message"

Claim 10, Column 29, Line 64: "the fifth message" should read "the message"

Claim 10, Column 29, Line 67: "identifier," should read "identifier;"

Claim 10, Column 30, Line 3: "identifier," should read "identifier;"

Claim 14, Column 30, Line 25: "comprising" should read "comprising:"

Claim 14, Column 30, Line 26: "a processor," should read "a processor;"

Claim 15, Column 30, Line 48: "equipment UE;" should read "equipment (UE)"

Signed and Sealed this  
Nineteenth Day of May, 2020

Andrei Iancu  
*Director of the United States Patent and Trademark Office*